US012610001B2

(12) United States Patent
Bakker et al.

(10) Patent No.: US 12,610,001 B2
(45) Date of Patent: Apr. 21, 2026

(54) USER EQUIPMENT (UE) CONFIGURATION FOR ACCESSING A TARGET CELL IN AN INTEGRATED ACCESS AND BACKHAUL (IAB) NETWORK

(71) Applicant: Nokia Technologies Oy, Espoo (FI)

(72) Inventors: Hajo Bakker, Eberdingen (DE); Oliver Blume, Stuttgart (DE); Ingo Viering, Munich (DE); Malgorzata Tomala, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 308 days.

(21) Appl. No.: 18/560,579

(22) PCT Filed: Mar. 25, 2022

(86) PCT No.: PCT/FI2022/050192
§ 371 (c)(1),
(2) Date: Nov. 13, 2023

(87) PCT Pub. No.: WO2022/243595
PCT Pub. Date: Nov. 24, 2022

(65) Prior Publication Data
US 2024/0251031 A1 Jul. 25, 2024

Related U.S. Application Data

(60) Provisional application No. 63/191,807, filed on May 21, 2021.

(51) Int. Cl.
H04W 36/30 (2009.01)
H04L 69/28 (2022.01)
H04W 36/36 (2009.01)

(52) U.S. Cl.
CPC ........... H04L 69/28 (2013.01); H04W 36/305 (2018.08); H04W 36/362 (2023.05)

(58) Field of Classification Search
None
See application file for complete search history.

(56) References Cited

U.S. PATENT DOCUMENTS 11,307,310 B2 4/2022 Wigard et al.
2020/0275340 A1 8/2020 Kim et al.
(Continued)

FOREIGN PATENT DOCUMENTS

CN 110536350 A * 12/2019 ........... H04W 76/27
EP 2549825 A1 1/2013
(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.
(Continued)

*Primary Examiner* — Kodzovi Acolatse
(74) *Attorney, Agent, or Firm* — Robert P. Michal, Esq.; Rimon PC

(57) ABSTRACT

Systems, methods, apparatuses, and computer program products for user equipment (UE) configuration for accessing at least one cell are provided. For instance, an IAB donor centralized unit (CU) may transmit configuration information for controlling accessing the at least one cell in a dedicated time period in case an operation and management (O&M) or the CU allocates a new physical layer cell identity (PCI) to a IAB-node serving the UE. The message may be directed to UEs served by the IAB-node. In a second scenario, the message may be directed to the mobile terminal
(Continued)

(MT) of an IAB node to configure a target parent cell for the case of backhaul radio link failure (RLF).

20 Claims, 14 Drawing Sheets

(56)                     References Cited

U.S. PATENT DOCUMENTS

| | | | |
|---|---|---|---|
| 2021/0045170 A1 | 2/2021 | Luo et al. | |
| 2021/0051545 A1 | 2/2021 | Luo et al. | |
| 2021/0058835 A1 | 2/2021 | Luo et al. | |
| 2021/0059015 A1 | 2/2021 | Luo et al. | |
| 2024/0187950 A1* | 6/2024 | Kim | H04W 36/08 |
| 2025/0324375 A1* | 10/2025 | Wu | H04W 72/231 |

FOREIGN PATENT DOCUMENTS

| | | | | |
|---|---|---|---|---|
| EP | 2568749 B1 | 1/2018 | | |
| WO | 2019/138155 A1 | 7/2019 | | |
| WO | WO-2020051588 A1 * | 3/2020 | | H04W 76/19 |
| WO | 2022/027389 A1 | 2/2022 | | |
| WO | 2022/061780 A1 | 3/2022 | | |

OTHER PUBLICATIONS

"3rd Generation Partnership Project; Technical Specification Group Radio Access Network; NG-RAN; F1 application protocol (F1AP) (Release 16)", 3GPP TS 38.473, V16.5.0, Apr. 2021, pp. 1-463.

"3rd Generation Partnership Project; Technical Specification Group Radio Access Network; NG-RAN; Xn application protocol (XnAP) (Release 16)", 3GPP TS 38.423, V16.5.0, Apr. 2021, pp. 1-461.

"3rd Generation Partnership Project; Technical Specification Group Radio Access Network; NG-RAN; Architecture description (Release 16)", 3GPP TS 38.401, V16.5.0, Apr. 2021, pp. 1-79.

"CB#11 IABInterDonorMigration", 3GPP TSG-RAN WG3 #112-e, R3-206854, Agenda: 13.2.1, Qualcomm, Nov. 2-13, 2020, 38 pages.

"[Post113-e][057][ IAB17] CHO and DAPS for IAB (CATT)", 3GPP TSG-RAN WG2 #113bis-e, R2-21xxxxx, Agenda: 8.4.3, CATT, Apr. 12-20, 2021, pp. 1-15.

"5G NR: Primary Synchronization Signal (PSS)", How LTE Stuff Works?, Retrieved on Dec. 4, 2023, Webpage available at : http://howltestuffworks.blogspot. com/2019/10/5g-nr-primary-synchronization-signal-pss.html.

"3rd Generation Partnership Project; Technical Specification Group Radio Access Network; NR; NR and NG-RAN Overall Description; Stage 2 (Release 16)", 3GPP TS 38.300, V16.4.0, Dec. 2020, pp. 1-149.

Mwanje et al., "On the limits of PCI auto configuration and reuse in 4G/5G ultra dense networks", 11th International Conference on Network and Service Management (CNSM), Nov. 9-13, 2015, pp. 92-98.

Szilágyi et al., "Physical Cell ID Allocation in Multi-layer, Multi-vendor LTE Networks", Mobile Networks and Management, 2013, pp. 1-13.

"Baseline of Conditional Handover and its optional enhancements", 3GPP TSG-RAN WG2 Meeting #104, R2-1817686, Agenda: 12.3.3, Nokia, Nov. 12-16, 2018, 4 pages.

"On Applicability of Conditional Handover in NR-U", 3GPP TSG-RAN WG2 Meeting #110-e, R2-2004696, Agenda: 6.2.3, MediaTek Inc, Jun. 1-12, 2020, 2 pages.

"CHO and DAPS-like", 3GPP TSG-RAN WG2 Meeting #114-e, R2-2104780, Agenda: 8.4.3, CATT, May 19-27, 2021, 6 pages.

International Search Report and Written Opinion received for corresponding Patent Cooperation Treaty Application No. PCT/FI2022/050192, dated Jun. 9, 2022, 20 pages.

"Discussion on inter-donor IAB migration", 3GPP TSG-RAN WG3 Meeting #112 electronic, R3-212046, Agenda: 13.2.1.1, Fujitsu, May 17-27, 2021, 11 pages.

"Mobile IAB (Integrated Access and Backhaul) for NR", 3GPP TSG RAN meeting #101, RP-231849, Agenda: 9.3.3.3, Qualcomm Incorporated, Sep. 11-15, 2023, pp. 1-13.

Extended European Search Report received for corresponding European Patent Application No. 22804117.4, dated Mar. 21, 2025, 11 pages.

* cited by examiner

702 — Perform a conditional handover decision

704 — Transmit, to a user equipment, configuration information for accessing at least one cell

700

800

802    Receive, from a network node, configuration information for accessing at least one cell 804    Start the first timer when a failure is detected for the link to the current serving cell of the apparatus 806    Attempt to access the at least one cell until expiration of the first timer or until success of the attempt

USER EQUIPMENT (UE) CONFIGURATION FOR ACCESSING A TARGET CELL IN AN INTEGRATED ACCESS AND BACKHAUL (IAB) NETWORK

RELATED APPLICATION

This application was originally filed as PCT Application No. PCT/FI2022/050192 on Mar. 25, 2022, which claims priority from U.S. Provisional Application No. 63/191,807, filed on May 21, 2021, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for user equipment (UE) configuration for selecting a target cell in an integrated access and backhaul (IAB) network.

BACKGROUND

Examples of mobile or wireless telecommunication systems may include, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G is mostly built on a new radio (NR), but a 5G network can also build on E-UTRA radio. In 5G, the nodes that can provide radio access functionality to a user equipment (i.e., similar to Node B in UTRAN or eNB in LTE) may be named gNB when built on NR radio and may be named NG-eNB when built on E-UTRA radio.

Integrated access and backhaul (IAB) nodes may be incorporated into a telecommunication system (e.g., NR system) to enable fast and cost-efficient deployments, such as those related to dense millimeter wave (mmWave) deployments in outdoor environments. IAB nodes may use the same spectrum and air interface for access and backhaul, creating a hierarchical wireless multi-hop network between sites. The hops may terminate at a donor node that is connected using a fixed backhaul to the 5G core network (5GC). The IAB architecture may use the 5G NR gNB logical split architecture, with a centralized unit (CU) and donor unit (DU) at the IAB donor node and distributed units (DUs) at the IAB nodes. An IAB node may include a mobile terminal (IAB-MT) part that may operate like a UE toward the parent node. On the child links, the DU part of an IAB node may operate like a gNB toward the next-hop IAB node. On the access links, the IAB nodes may operate like ordinary gNBs, providing the NR radio interface for UEs in their coverage areas.

SUMMARY

According to a first embodiment, an apparatus may include at least one processor and at least one memory including computer program code. The at least one memory and the computer program code may be configured to, with the at least one processor, cause the apparatus at least to transmit, to a user equipment, configuration information for accessing at least one cell. The configuration information may include: one or more identities of the at least one cell. The at least one cell may be associated with a dedicated time period defined by a timer, and the dedicated time period may be for accessing exclusively the at least one cell when a failure is detected for a link to a current serving cell of the user equipment. In a variant, the configuration information may further comprise a configuration of the timer.

In a variant, the at least one memory and the computer program code may be configured to, with the at least one processor, cause the apparatus at least to receive the configuration information from a target donor centralized unit or an operation and management-related node. In a variant, the at least one memory and the computer program code may be configured to, with the at least one processor, cause the apparatus, when transmitting the configuration information, at least to transmit the configuration information via an integrated access and backhaul distributed unit or a mobile integrated access and backhaul node. In a variant, the at least one memory and the computer program code may be configured to, with the at least one processor, cause the apparatus at least to transmit at least one of a radio resource control reconfiguration message comprising at least one of the one or more identities, or an F1 application protocol radio resource control reconfiguration message comprising at least one of the one or more identities, to an integrated access and backhaul node serving the user equipment. In a variant, the apparatus may include a source donor centralized unit. In a variant, the configuration information may be transmitted in at least one of a broadcast message, a group-cast message, a conditional handover message, or a radio resource control reconfiguration message.

According to a second embodiment, an apparatus may include at least one processor and at least one memory including computer program code. The at least one memory and the computer program code may be configured to, with the at least one processor, cause the apparatus at least to receive, from a network node, configuration information for accessing at least one cell. The configuration information may include one or more identities of the at least one cell. The at least one cell may be associated with a dedicated time period defined by a first timer, and the dedicated time period may be for accessing exclusively the at least one cell when a failure is detected for a link to a current serving cell of the user equipment. The at least one memory and the computer program code may be configured to, with the at least one processor, cause the apparatus at least to start the first timer when a failure is detected for the link to the current serving cell of the apparatus. The at least one memory and the computer program code may be configured to, with the at least one processor, cause the apparatus at least to attempt to access the at least one cell until expiration of the first timer or until success of the attempt. In a variant, the configuration information may further include a configuration of the first timer.

In a variant, the at least one memory and the computer program code may be configured to, with the at least one processor, cause the apparatus, when attempting to access the at least one cell, at least to, when a cell of the at least one cell is detectable and the apparatus has a conditional handover configuration for the detected cell, perform the conditional handover to the cell, or when the cell of the at least one cell is detectable and the apparatus does not have the conditional handover configuration for the detected cell, perform a re-establishment to the cell. In a variant, the apparatus may not be configured with conditional handover, and the at least one memory and the computer program code may be configured to, with the at least one processor, cause the apparatus, when attempting to access the at least one cell, at least to, when a cell of the at least one cell is detectable, perform a connection re-establishment to the detectable cell.

In a variant, the configuration information may be received in at least one of: a broadcast message, a groupcast message, a conditional handover message, or a radio resource control reconfiguration message. In a variant, the at least one memory and the computer program code may be configured to, with the at least one processor, cause the apparatus, when receiving the configuration information at least to receive the configuration information from an integrated access and backhaul node. In a variant, the at least one memory and the computer program code may be configured to, with the at least one processor, cause the apparatus, when receiving the configuration information, at least to receive the configuration information from a source donor centralized unit. In a variant, the at least one memory and the computer program code may be configured to, with the at least one processor, cause the apparatus, when receiving the configuration information, at least to receive the configuration information from a target donor centralized unit via the source donor centralized unit.

In a variant, the at least one memory and the computer program code may be configured to, with the at least one processor, cause the apparatus at least to receive a configuration of a second timer related to radio link failure detection, and disable the second timer when receiving the configuration information. In a variant, the at least one memory and the computer program code may be configured to, with the at least one processor, cause the apparatus at least to, upon expiry of the first timer, start a third timer, and attempt to access a cell different from the at least one cell prior to expiry of the third timer. In a variant, the at least one memory and the computer program code may be configured to, with the at least one processor, cause the apparatus at least to start a fourth timer simultaneously with the first timer, and the at least one memory and the computer program code may be configured to, with the at least one processor, cause the apparatus, when attempting to access the at least one cell, at least to attempt to access the at least one cell after expiry of the fourth timer.

In a variant, the at least one memory and the computer program code may be configured to, with the at least one processor, cause the apparatus at least to start a fourth timer when a failure is detected for a link to the current serving cell, and the at least one memory and the computer program code may be configured to, with the at least one processor, cause the apparatus, when starting the first timer, at least to start the first timer after expiry of the fourth timer. In some embodiments, the fourth timer may comprise one of: a timer defining a user specific time delay, or a timer defining a time period for re-connecting to the current serving cell.

According to a third embodiment, an apparatus may include at least one processor and at least one memory including computer program code. The at least one memory and the computer program code may be configured to, with the at least one processor, cause the apparatus at least to receive configuration information for a user equipment accessing at least one cell. The configuration information may include one or more identities of the at least one cell. The at least one cell may be associated with a dedicated time period defined by a timer, and the dedicated time period may be for accessing exclusively the at least one cell when a failure is detected for a link to a current serving cell of the user equipment. The at least one memory and the computer program code may be configured to, with the at least one processor, cause the apparatus at least to transmit the configuration information to the user equipment. The at least one memory and the computer program code may be configured to, with the at least one processor, cause the apparatus at least to receive an assigned new cell identity, where the new cell identity may be the same as one of the one or more identities. The at least one memory and the computer program code may be configured to, with the at least one processor, cause the apparatus at least to operate based on the new assigned cell identity.

In a variant, the at least one memory and the computer program code may be configured to, with the at least one processor, cause the apparatus, when operating based on the assigned new cell identity, at least to connect to a centralized unit based on the new cell identity, or broadcast one or more synchronization signal blocks based on the new cell identity. In a variant, the configuration information may further include a configuration of the timer.

According to a fourth embodiment, a method may include transmitting, by an apparatus to a user equipment, configuration information for accessing at least one cell. The configuration information may include: one or more identities of the at least one cell.

The at least one cell may be associated with a dedicated time period defined by a timer, and the dedicated time period may be for accessing exclusively the at least one cell when a failure is detected for a link to a current serving cell of the user equipment.

In a variant, method may further include receiving the configuration information from a target donor centralized unit or an operation and management-related node. In a variant, the transmitting the configuration information may further include transmitting the configuration information via an integrated access and backhaul distributed unit or a mobile integrated access and backhaul node. In a variant, method may further include transmitting at least one of a radio resource control reconfiguration message comprising at least one of the one or more identities, or an F1 application protocol radio resource control reconfiguration message comprising at least one of the one or more identities, to an integrated access and backhaul node serving the user equipment. In a variant, the apparatus may include a source donor centralized unit. In a variant, the configuration information may be transmitted in at least one of a broadcast message, a groupcast message, a conditional handover message, or a radio resource control reconfiguration message. In a variant, the configuration information may further include a configuration of the timer.

According to a fifth embodiment, a method may include receiving, from a network node, configuration information for accessing at least one cell. The configuration information may include one or more identities of the at least one cell. The at least one cell may be associated with a dedicated time period defined by a first timer, and the dedicated time period may be for accessing exclusively the at least one cell when a failure is detected for a link to a current serving cell of the user equipment. The method may further include starting the first timer when a failure is detected for the link to the current serving cell of the apparatus. The method may further include attempting to access the at least one cell until expiration of the first timer or until success of the attempt. In a variant, the configuration information may further include a configuration of the first timer.

In a variant, the attempting to access the at least one cell may further include, when a cell of the at least one cell is detectable and the apparatus has a conditional handover configuration for the detected cell, performing the conditional handover to the cell, or when the cell of the at least one cell is detectable and the apparatus does not have the conditional handover configuration for the detected cell, performing a re-establishment to the cell. In a variant, the apparatus may not be configured with conditional handover, and the attempting to access the at least one cell may further include, when a cell of the at least one cell is detectable, performing a connection re-establishment to the detectable cell. In a variant, the configuration information may be received in at least one of: a broadcast message, a groupcast message, a conditional handover message, or a radio resource control reconfiguration message. In a variant, the receiving the configuration information may further include receiving the configuration information from an integrated access and backhaul node.

In a variant, the receiving the configuration information may further include receiving the configuration information from a source donor centralized unit. In a variant, the receiving the configuration information may include receiving the configuration information from a target donor centralized unit via the source donor centralized unit. In a variant, the method may further include receiving a configuration of a second timer related to radio link failure detection, and disabling the second timer when receiving the configuration information. In a variant, the method may further include, upon expiry of the first timer, starting a third timer, and attempting to access a cell different from the at least one cell prior to expiry of the third timer. In a variant, the method may further include starting a fourth timer simultaneously with the first timer, and the attempting to access the at least one cell may further include attempting to access the at least one cell after expiry of the fourth timer.

In a variant, the method may further include starting a fourth timer when a failure is detected for a link to the current serving cell, and the starting the first timer may include starting the first timer after expiry of the fourth timer. In some embodiments, the fourth timer may comprise one of: a timer defining a user specific time delay, or a timer defining a time period for re-connecting to the current serving cell.

According to a sixth embodiment, a method may include receiving configuration information for a user equipment accessing at least one cell. The configuration information may include one or more identities of the at least one cell. The at least one cell may be associated with a dedicated time period defined by a timer, and the dedicated time period may be for accessing exclusively the at least one cell when a failure is detected for a link to a current serving cell of the user equipment. The method may further include transmitting the configuration information to the user equipment. The method may further include receiving an assigned new cell identity, where the new cell identity may be the same as one of the one or more identities. The method may further include operating based on the new assigned cell identity.

In a variant, the operating based on the assigned new cell identity may include connecting to a centralized unit based on the new cell identity, or broadcasting one or more synchronization signal blocks based on the new cell identity. In a variant, the configuration information may further include a configuration of the timer.

A seventh embodiment may be directed to an apparatus that may include circuitry configured to cause the apparatus to perform the method according to the fourth embodiment, the fifth embodiment, or the sixth embodiment, or any of the variants discussed above.

An eighth embodiment may be directed to an apparatus that may include means for performing the method according to the fourth embodiment, the fifth embodiment, or the sixth embodiment, or any of the variants discussed above. Examples of the means may include one or more processors, memory, and/or computer program codes for causing the performance of the operation.

A ninth embodiment may be directed to a computer readable medium comprising program instructions stored thereon for causing an apparatus to perform at least the method according to the fourth embodiment, the fifth embodiment, or the sixth embodiment, or any of the variants discussed above.

A tenth embodiment may be directed to a computer program product encoding instructions for causing an apparatus to perform at least the method according to the fourth embodiment, the fifth embodiment, or the sixth embodiment, or any of the variants discussed above.

BRIEF DESCRIPTION OF THE DRAWINGS

For proper understanding of example embodiments, reference may be made to the accompanying drawings, wherein.

DETAILED DESCRIPTION

Figure 1A:
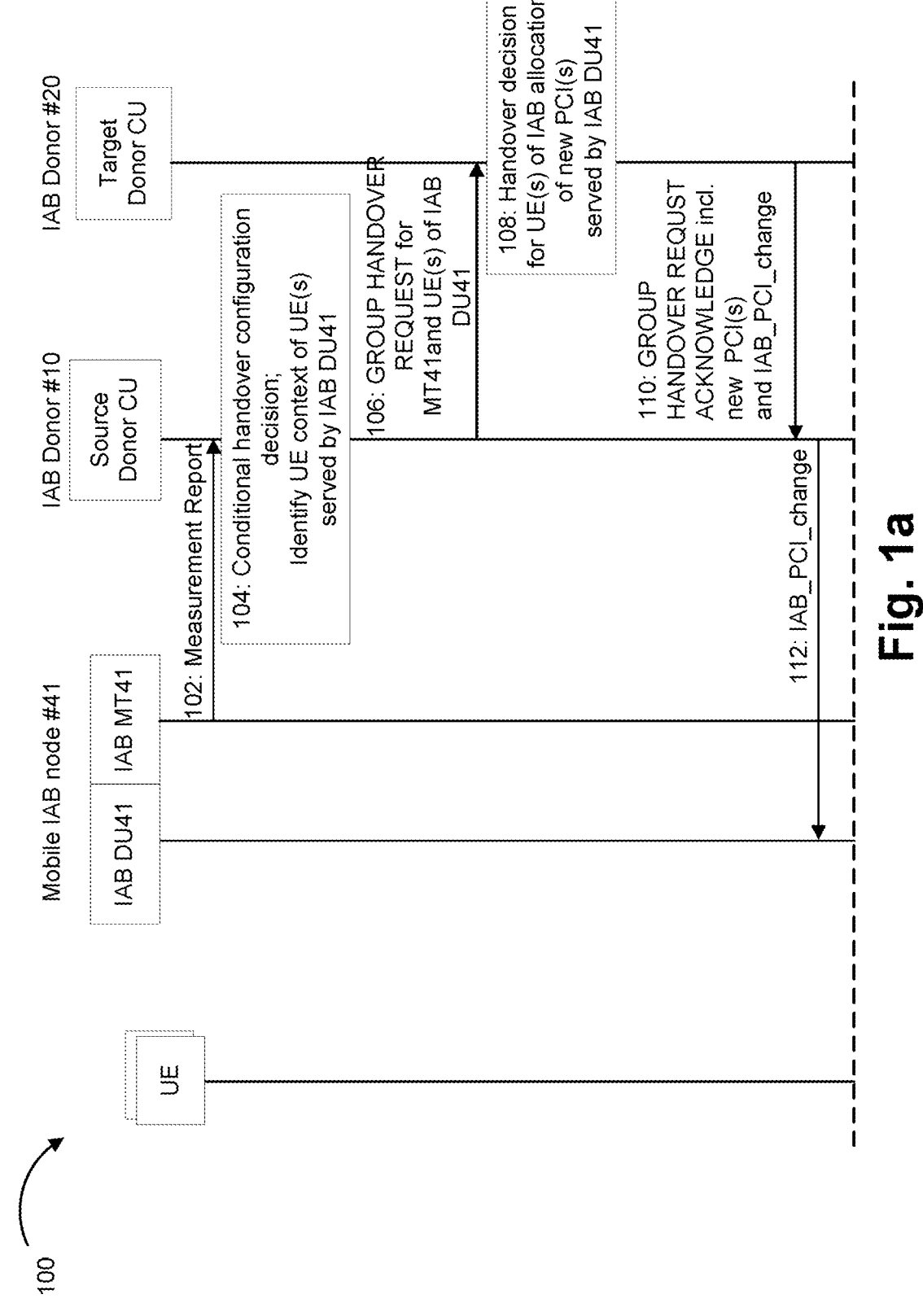
FIG. 1*a* illustrates a portion of an example signal diagram for transfer of IAB physical layer cell identifier (PCI) change (IAB_PCI_change) information from a target centralized unit (CU) to UEs served by a mobile IAB node that is configured to change its PCI during topology adaptation, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for UE configuration for selecting a target cell in an IAB network is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar wording, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar wording, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

In a communication system, e.g., NR, an IAB node may need to be configured to change the PCI of at least one of its cells, e.g., due to a newly detected PCI conflict or PCI confusion with another cell in the network. This change of PCI can result in all UEs of this cell losing the cell synchronization. In some deployments, e.g., for UEs inside a moving IAB node, it is advantageous if the UEs could reconnect to the same physical cell after the cell is configured with the new PCI. However, the UEs meanwhile may undergo RLF and may re-establish connectivity to other cells. According to some embodiments of the present disclosure, the UEs may be configured with the new PCI of their serving cell and instructed to execute a conditional handover (CHO) or a radio resource control (RRC) re-establishment exclusively to this target cell. That is, they may be only allowed to access the cell with the configured new PCI, e.g., during a configured time period. This may allow the UEs of the IAB node to connected to the same physical cell quickly after the PCI has been changed.

In a communication system, e.g., NR, an IAB node may change its IAB backhaul connection to the donor gNB, e.g., perform intra-donor or even inter-donor topology adaptation. Such change or modification of an IAB backhaul connection may come with reconfigurations of one or more cells in the IAB node. For example, during the topology adaptation the target donor CU may decide to allocate a different PCI to one or more cells of the migrating IAB node as it may not be expected that the same PCI can be used. Similar to the previous case, the served UEs and child IAB nodes will lose synchronization with their serving cell. Service interruption to the served UEs may be an issue to be considered.

As one example, a mobile IAB node may be located on a moving object, e.g., a bus or train, and may provide wireless access to a UE inside or outside the moving object. As a result, one or more radio cell(s), provided by the mobile IAB node, may be moving among fixed radio cells provided by macro or pico cells. A fixed radio cell and a mobile IAB node, for each of its radio cells, may transmit a PCI, which may be decoded by the UEs. There may be 1008 PCI values in NR, while one control unit (CU) can control up to 64.000 radio cells. This may mean that the same PCI may be allocated to many cells controlled by one CU, especially if the PCI pool is fragmented into smaller pools, e.g., a separate pool for different IAB nodes. Within a fixed environment, the PCI allocation may be part of the network planning and may not result in PCIs which are geographically proximate to each other. Nevertheless, due to unexpected coverage (which may also be called overshoot), a PCI confusion or collision might occur, and this may be addressed, e.g., by eNBs or gNBs exchanging, via the Xn interface, the PCI and E-UTRAN cell global identifier (ECGI) pairs of their cells, as well as that of the neighbors of their cells. For mobile IAB nodes such conflicts may occur more frequently.

When the mobile IAB node moves, it may approach another cell (a fixed gNB or another moving cell) that may be using the same PCI. The CU may have to reassign a new PCI to the cell of the moving IAB node to prevent PCI confusion or collision. There may be an impact of the PCI change on the UEs served by the mobile IAB node, and the UEs connected to a mobile IAB-node may be configured with a CHO towards the new PCI, which may cause issues.

As explained above, conflict of PCI between cells of moving IAB nodes and fixed cells (gNBs or static IAB nodes) may be managed by assigning a subset of PCIs just to moving cells. With the limitation of 1008 PCIs, and especially if an exclusive set of PCIs, e.g., 10%, is allocated for mobile IAB nodes, it cannot be avoided that mobile IAB nodes, e.g., installed in busses, trains, or other moving objects, may transmit the same PCI and may approach each other. To avoid a PCI collision or confusion, a PCI change for one mobile IAB node may have to be performed in some cases. For example, a PCI change may be needed when a moving IAB node approaches another cell which is using the same PCI. "Approaching" in this context may mean a proximity between the cells such that the two cells with the same PCI have a common neighbor (PCI confusion) or even are neighbors themselves (PCI collision). It may not be relevant whether the other cell is a cell served by an IAB node or by a conventional gNB or a cell served by an IAB node backhauled by the same or a different donor.

The procedure to detect the need for such a PCI change might be executed inside the operation and management (O&M) or in the CU. This may be based on, e.g., geographical data, exchange of neighbor cell lists between gNBs via Xn or X2 interfaces, measurement reports from the UE extended by instructing UEs with ECGI readings, and/or increased failure rates in the handover statistics. In some cases, the change of PCI may be triggered when an IAB node performs MT handover and topology adaptation.

There may be several problems that occur for a handover from a mobile IAB node to a new target parent IAB node or a new donor node. A mobile IAB node may be installed inside a train, subway, bus, or the like and may serve via its DU UEs inside the vehicle. The DU of the IAB-node may be transmitting synchronization signal blocks (SSBs) which may have a PCI (e.g., with a value of 10) encoded and may serve either UEs with CHO capability or UEs which do not support CHO. The mobile IAB node may be connected by a parent IAB node to a first IAB-donor.

Based on the movement of the mobile IAB-node, the MT part of the mobile IAB node may transmit a measurement event, e.g., A3, report via the serving IAB-node towards a CU of the first IAB donor, which may start the handover process to the target IAB node. The target IAB node may have a different IAB donor (a second IAB donor), or the same as the first IAB donor. The IAB node may be connected to the second IAB donor that may control a second mobile IAB node, which may also transmit SSBs with the PCI encoded. During the handover process, the second IAB donor may detect a possible PCI confusion or collision of PCI 10, and may allocate a new PCI (with a value of 20) to be used by the DU of the mobile IAB node after the handover of the MT (of the mobile IAB node) is completed. Alternatively, the O&M might inform the second IAB donor about the PCI confusion or collision.

After the mobile IAB node is instructed with changing the PCI, the transmission of the PCI 10 may be stopped by the DU of the mobile IAB node, and after a delay the PCI 20 may be transmitted. When the DU of the mobile IAB has changed the PCI from, e.g., PCI 10 to PCI 20, UEs may detect physical layer problems, as the PCI 10, which is encoded in the primary synchronization signal (PSS) and the secondary synchronization signal (SSS), may no longer be decoded. The T310 timer guarding radio link failure detection may be started by the UEs after discovering physical layer issues, and a radio link failure (RLF) may occur if the T310 timer expires, which may lead to connection failures due to one of the following four problems: 1) uncertainty for CHO UEs' behavior, 2) waste of time and energy, 3) selection of a wrong cell, or 4) a signaling storm.

With respect to uncertainty for CHO UEs' behavior, execution of a CHO may be based on conditions, e.g., an A3 event in which, based on mobility, the reference signal received power (RSRP) of the serving cell (PCI 10) may decrease while the RSRP of the target cell (PCI 20) increases. If the difference between the RSRP values exceed a configured value, the UE may define the A3 event as fulfilled and may carry out the configured handover. In case the PCI 10 is no longer detectable, the difference of RSRP may no longer be computable and it may be UE vendor-specific whether a CHO configured UE defines this as a valid CHO event (starting the T304 timer) or may start the T310 timer of the RLF procedure.

With respect to wasting time and energy, when no CHO is configured or the implementation of the UEs does not handle loss of synchronization as a CHO event, the recovery procedure of RLF may begin and the T310 timer may be started by the UEs. As long as the T310 timer does not expire, UEs not supporting CHO and CHO UEs that did not carry out the handover based on the PCI change can try to continue the connection to the serving cell, e.g., towards PCI 10. After the PCI 10 has been switched off, attempts for continuation might fail, e.g., the UEs may waste energy searching for the non-existent PCI 10 and also time may be wasted as there may not be uplink or downlink data transmitted during the running of the T310 timer.

When the T310 timer expires, the UEs may declare a RLF and may start the process of initiating new connection establishment guarded by the T311 timer. The initial step of the process may involve the UE selecting a suitable cell. If the cell of the moving IAB node is already transmitting the new PCI 20, it may be received with the strongest RSRP and may be selected. But, if the new PCI 20 is not yet transmitted, the UE may select another cell, e.g., a proximate macro cell. Afterwards, when the moving IAB node has completed cell setup, this may become the cell with the strongest RSRP and a further handover from the macro to the new cell with PCI 20 may occur, which may involve additional signaling and handover interruption time.

With respect to selection of an incorrect cell, the target CU may host or determine another cell in the area which is transmitting PCI 10 (this may be the reason for changing the PCI for the moving IAB node). If this cell is nearby outside the vehicle, the UEs may receive the PCI 10 (possibly with a weaker signal) and may resynchronize to this other cell. The UE may only assume it is resynchronizing to its previous serving cell, but actually it may sync to the other cell. Similar to that described above, a further handover of the UE may happen once the moving IAB node starts transmitting PCI 20 with a stronger signal.

With respect to a signaling storm, as UEs may be configured with the same cell specific T310 and T311 timers, several or all of the served UEs may simultaneously start the re-connection (CHO UEs when starting the T304 timer) or re-establishment (when starting the T311 timer for non-CHO UEs after the T310 timer and for CHO UEs after the T304 timer). Taking into account that many UEs may be served by a mobile IAB node, e.g., within a vehicle, this may lead to an unwanted signaling storm with respect to random access channel (RACH) access and signaling towards the CU.

As can be understood from the above, there may be several problems in NR related to changing the PCI of a mobile IAB node, and subsequent impacts on UE operations. As such, there may be a need for enhancements to operations related to failure detection, handover or re-establishment procedures of UEs.

Some embodiments described herein may provide for UE configuration for accessing a cell, e.g., when PCI of serving IAB node changes. For instance, certain embodiments may provide a control mechanism for mobility events of migrating users connected to a mobile IAB node. This may be enabled by a message generated by an IAB donor CU. The message content may be generated in case the O&M or CU allocates a new PCI to be transmitted by the mobile IAB node. The message may be directed to UEs served by the mobile IAB node, e.g., it may be transmitted from the CU onwards as, e.g., dedicated radio resource control (RRC) message via its IAB child nodes and via the mobile IAB node to the UEs.

The message may trigger procedures in the UEs receiving it for handling mobility or failure detection related events. The message may configure a UE, in case the current PCI is no longer detectable (e.g., physical layer problems are detected), for handover (in case of CHO configured) or for re-establishment to cells (PCIs) that are listed in the message and not to attempt to continue the connection to the serving cell. The message may trigger additional procedures in the UEs by including timers to avoid excessive signaling load caused by multiple UEs simultaneously when the new PCI is detectable. The message reception by the UE can enable an IAB-specific failure handling by controlling failure phases with the new timers, e.g., the T311 timer may start after the expiry of another timer.

Figure 1B:
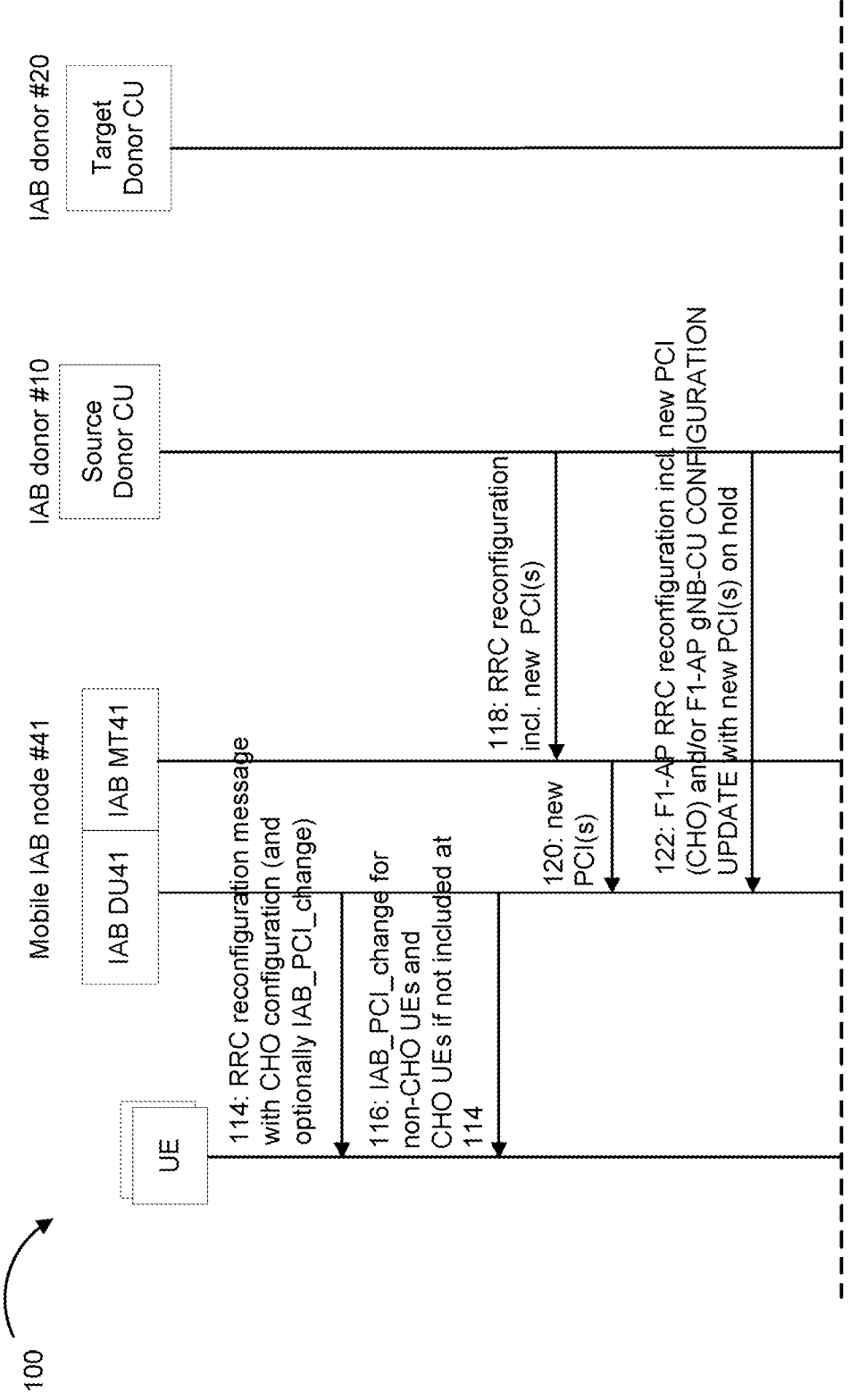
FIG. 1*b* illustrates another portion of the example signal diagram for transfer of an IAB PCI change (IAB_PCI_change) information from a target CU to UEs served by a mobile IAB node that is configured to change its PCI during topology adaptation, according to some embodiments.
Figure 1C:
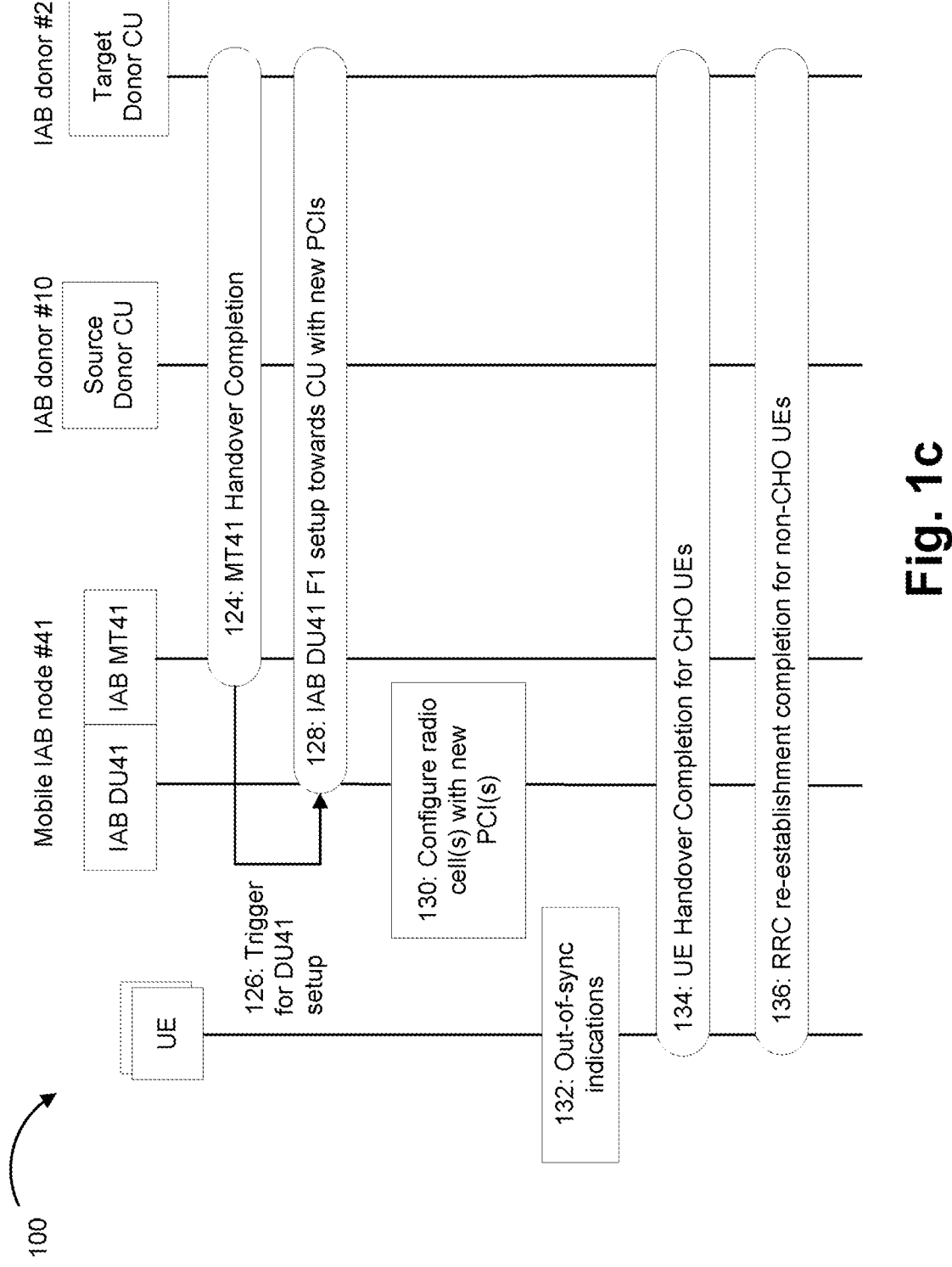
FIG. 1*c* illustrates another portion of the example signal diagram for transfer of an IAB PCI change (IAB_PCI_change) information from a target centralized unit (CU) to UEs served by a mobile IAB node that is configured to change its PCI during topology adaptation, according to some embodiments.

FIGS. 1*a*, 1*b*, and 1*c* illustrate an example signal diagram 100 for transfer of IAB PCI change (IAB_PCI_change) information from a target CU to UEs served by a mobile IAB node, according to some embodiments. As illustrated in FIGS. 1*a*, 1*b*, and 1*c*, the signal diagram 100 includes UE(s), an IAB DU41, and IAB MT41, a source donor CU, and a target donor CU. The IAB DU41 and the IAB MT41 may form part of a mobile IAB node #41, the source donor CU may form part of an IAB donor #10, and the target donor CU may form part of an IAB donor #20.

As illustrated at 102, the IAB MT41 may send, and the source donor CU may receive, a measurement report. As illustrated at 104, the source donor CU may perform a conditional handover configuration decision, and may identify the UE context of UE(s) served by the IAB DU41. As illustrated at 106, the source donor CU may send, and the target donor CU may receive, a handover request for MT41 and UE(s) of the IAB DU41. The handover requests for some or all of the MT41 and the UE(s) may be signaled as a group handover. As illustrated at 108, the target donor CU may perform a handover decision for MT41 and for UE(s) of the IAB #41, and determine an allocation of new PCI(s) for one or multiple cells served by the IAB DU41. As illustrated at 110, the target donor CU may send, and the source donor CU may receive, a group handover request acknowledge including new PCI(s) and information for the IAB PCI change (which may be referred to as IAB_PCI_change).

The IAB_PCI_change information may be UE-dedicated and generated by the target donor CU of the IAB donor #20 in case the PCI of the mobile IAB node #41 has to be changed. Alternatively, the IAB_PCI_change information may be communicated to the UE in a system information broadcast. The IAB_PCI_change information may include one or more new PCIs to which the UE is allowed to connect. Additionally, or alternatively, the IAB_PCI_change information may include one or more timers, such as an IAB dedicated cell timer (T_IAB_dedicated_cell) defining a time period dedicated for accessing the one or more cells, and/or an IAB delay timer (T_IAB_delay) defining a time delay for accessing a cell. In some embodiments, instead of being included in the IAB-PCI-change information, some or all of the timers may be configured via a separate message to the UE. The separate message may be sent to the UE prior to, together with, or after the transmission of the IAB_PCI_change information.

As explained below, the information may be sent to the UE(s) served by the mobile IAB node #41 prior to the handover of the IAB MT41. The IAB_PCI_change information may configure the UE(s) to perform various operations upon detecting a failure of a link to current serving cell, e.g., when the UE receives, from its lower layers, one or more (e.g., a configured number N310) consecutive out-of-sync indications. For example, the IAB_PCI_change information may configure the UE to start an IAB specific timer (e.g., T_IAB_dedicated_cell) upon the detection of the failure. The timer value may be contained in the IAB_PCI_change information. Alternatively, in case a specific timer is not contained in the IAB_PCI_change information, the value for the IAB-specific timer may be preconfigured in some IAB-capable UEs, or configured to the UE via another separate message. For CHO configured UEs, when the IAB_PCI_change information is received, the CHO event to the new PCI may be declared as valid and the UE may perform the handover as soon as a configured new PCI is detectable (novel CHO trigger event). For UEs not supporting CHO or not configured with CHO, the UE may perform a RRC re-establishment when one of the new PCIs is detectable without the T310 timer phase for re-sync to the original PCI (which is useless when the IAB_PCI_change information has indicated that the previous PCI is about to be turned off).

The duration of this configured UE operation may be limited to a dedicated time period, which is defined by the T_IAB_dedicated_cell timer in some embodiments. The T_IAB_dedicated_cell timer defines a time period dedicated for accessing cell(s) with the indicated new PCI(s). That is, accessing to other cells (different than that indicated in the IAB_PCI_change information) is prevented in this time period. If T_IAB_dedicated_cell timer expires, i.e. CHO or re-establishment to any of the indicated PCIs was not successful, the UE may start the T311 timer which defines a time period for accessing other cells.

In some embodiments, to avoid a signalling storm, the IAB_PCI_change information may configure the UEs (this can be dozens or even hundreds of UEs, e.g. inside a train) to start the CHO or the re-establishment with a UE-specific delay defined by the T_IAB_delay timer. The T_IAB_delay timer may run in parallel to the T_IAB_dedicated_cell timer, e.g., starts at the same time with the T_IAB_dedicated_cell timer. Alternatively, the T_IAB_dedicated_cell timer may start when the T_IAB_delay timer expires. A dedicated value of the T_IAB_delay timer may be included in the IAB_PCI_change information for each UE. Alternatively, the UEs may be configured to draw a random number to select an individual value of the timer, or the UE may receive a configuration for the timer via another separate message.

The transfer of the IAB_PCI_change information from the target donor CU may be via the source donor CU. The IAB_PCI_change information may be transferred through one or more other IAB-nodes. The information may be transparently forwarded by the intermediate IAB-nodes.

The IAB_PCI_change information may be sent as an RRC message individually to the UEs of the mobile IAB node #41, or may be included in a CHO preparation message of CHO-capable UEs or may be transmitted via broadcast or groupcast by the mobile IAB node #41. Group handover may provide advantages when many UEs are served by the moving IAB, such as reducing signaling from CU to the IAB node.

To enable a defined start of the failure procedure, the T311 timer may be started after the procedure configured by the IAB_PCI_change information is finalized. With the reception of the IAB_PCI_change information, the UE may ignore the T310 timer configuration or apply it with a null value, which may imply that a phase given for the UE for resolving of physical layer problems may not be started upon receiving N310 consecutive out-of-sync indications. The T311 timer may start after the T_IAB_dedicated_cell timer has expired.

As illustrated at 112, the source donor CU may send, and the IAB DU41 may receive, the IAB_PCI_change information. The IAB_PCI_change information may be sent in a radio resource control (RRC) reconfiguration message, in some embodiments. In some other embodiments, the IAB_PCI_change may be sent by a F1 application protocol radio resource control reconfiguration message. These and other aspects of the configuration of the UE are described elsewhere herein.

Turning to FIG. 1*b*, and as illustrated at 114, the IAB DU41 may send and the UE(s) may receive, an RRC reconfiguration message with CHO configuration. In some embodiments, the RRC reconfiguration message may include the IAB_PCI_change information. In some other embodiments, the IAB_PCI_change information may be sent to the UE in a new message (e.g., at 116) instead. This embodiment is also applicable for UEs that are not capable of CHO configurations or are not intended to be configured with a CHO. As illustrated at 116, the IAB DU41 may send, and UE(s) not configured with CHO (which may be referred to as non-CHO UEs) may receive, the IAB_PCI_change information. UE(s) configured with CHO (which may be referred to as CHO UEs) may also receive the IAB_PCI_change information at 116 if the IAB_PCI_change information is not included in the RRC reconfiguration message at 114. As illustrated at 118, the source donor CU may send, and the IAB MT41 may receive, a RRC reconfiguration including new PCI(s). This message requests the MT41 to change the backhaul connection to a parent IAB or the donor DU of the target CU. As illustrated at 120, the IAB MT41 may send, and the IAB DU41 may receive, the new PCI(s). As illustrated at 122, the source donor CU may send, and the IAB DU41 may receive, an F1 application protocol (AP) RRC reconfiguration including a new PCI (for CHO). Additionally, or alternatively, the signaling at 122 may include an F1-AP gNB-CU configuration update with new PCI(s) on hold.

Turning to FIG. 1c, the handover of the IAB MT41 may be completed at 124. As illustrated at 126, the IAB MT41 may trigger setup for the IAB DU41. In some embodiments, handover completion, described below, may trigger the setup for the IAB DU41. As illustrated at 128, the IAB DU41 may perform F1 setup towards the target donor CU with new PCIs. The previous PCI is no longer transmitted by the cell(s) of DU41. As illustrated at 130, the IAB DU41 may configure radio cell(s) with the new PCI(s). As illustrated at 132, the UE(s) may receive out-of-sync indications. This may trigger the UE to perform operations configured by the IAB_PCI_change information. As illustrated at 134, UE handover may be performed for CHO UEs, according to the IAB_PCI_change information. As illustrated at 136, the RRC re-establishment may be performed for non-CHO UEs according to the IAB_PCI_change information.

The operations illustrated in, and described with respect to FIGS. 1a-1c, can be applied to the case of IAB MT handover within one CU. In this case, target donor CU is same as the source donor CU, and then the operations 106, 108, and 110 may not be performed. The above operations configured by IAB_PCI_change described with respect to FIGS. 1a-1c can also be applied to a scenario where a PCI change of DU41 is performed without a handover (HO) of the MT41. For example, O&M may decide to reassign the PCI of one or several cells of the DU41, e.g., due to a newly detected PCI conflict or PCI confusion with another cell in the network. In such a scenario, the O&M may trigger the donor CU of the DU41 to start the sequence at operation 112 of FIG. 1a.

Certain embodiments described herein may allow for directing of UEs inside of an IAB cell to the reconfigured cell with the new PCI. Some other embodiments may configure the MT of an IAB to connect to a predefined target cell when it experiences a RLF of the backhaul (BH) (as illustrated in, and described with respect to, FIGS. 5 and 6 below). An example use case for this for mmWave BH links where the line of sight may be suddenly blocked or for deployments with nomadic IAB nodes on privately owned vehicles that can be deactivated by the owner unexpectedly. For such rare and unexpected events it may not be suitable to configure the MT with a CHO, because the resource reservations for a CHO would block large amount of the BH resources. In this case, the information of the operation at 112 may be used to enforce the IAB MT41 to execute a RRC re-establishment towards a target parent cell with a PCI given in the IAB_PCI_change. Similar to the above embodiments for UEs, the IAB_PCI timer configures IAB-MTs with a time period dedicated for accessing one or more target parent cells, while access to other cells (different than that indicated in the IAB_PCI_change information) is prevented in this time period. This operation of the MT allows the network operator maintaining control of the IAB network topology; otherwise the MT would in case of RLF autonomously select a new parent cell according to the strongest RSRP value. MT BH RLF is assumed to be a rare event, i.e. not creating a signalling storm of multiple MTs. Thus, in some embodiment for IAB MTs the IAB delay timer (T_IAB_delay) for defining a time delay for accessing a cell is not applied. A Zero value for the IAB_delay timer reduces the interruption time experienced by the MT and the served UEs.

As explained above, certain embodiments may utilize various timers. For instance, the UE(s) may be capable of CHO and receiving the T_IAB_dedicated_cell and T_IAB_delay timers, and may store the configuration upon RRC reconfiguration message reception. The configuration storage may determine that start of the related procedure (for handling mobility or failure detection event) may not be triggered by detection of a physical layer problem, and it can also be triggered by the reception of a dedicated message, e.g., type 4 RLF indication of a BH failure of the parent IAB node.

In some embodiments, the T310 timer may be started upon receiving N310 consecutive out-of-sync indications, and may be operated in parallel to the T_IAB_dedicated_cell and T_IAB_delay timers. The T311 timer may start if all three timers have expired.

Alternatively or additionally, in some embodiments, instead of receiving a dedicated T_IAB_delay timer for a UE, the UE may select randomly a value out of a predefined range for determining the delay.

In some example embodiments, in addition to the PCIs, the new IAB_PCI_change information may also include the NR cell global identity (NCGI) and/or the NR cell identity (NCI), which may have to be detected by the UEs as long as the T_IAB_dedicated_cell timer is running. This may avoid the CHO or re-establishment to a second (mobile IAB) node with the same PCI. FIGS. 2a-4b below illustrate different configurations of the timers described above.

As described above, FIGS. 1a, 1b, and 1c are provided as examples. Other examples are possible, according to some embodiments.

Figure 2A:
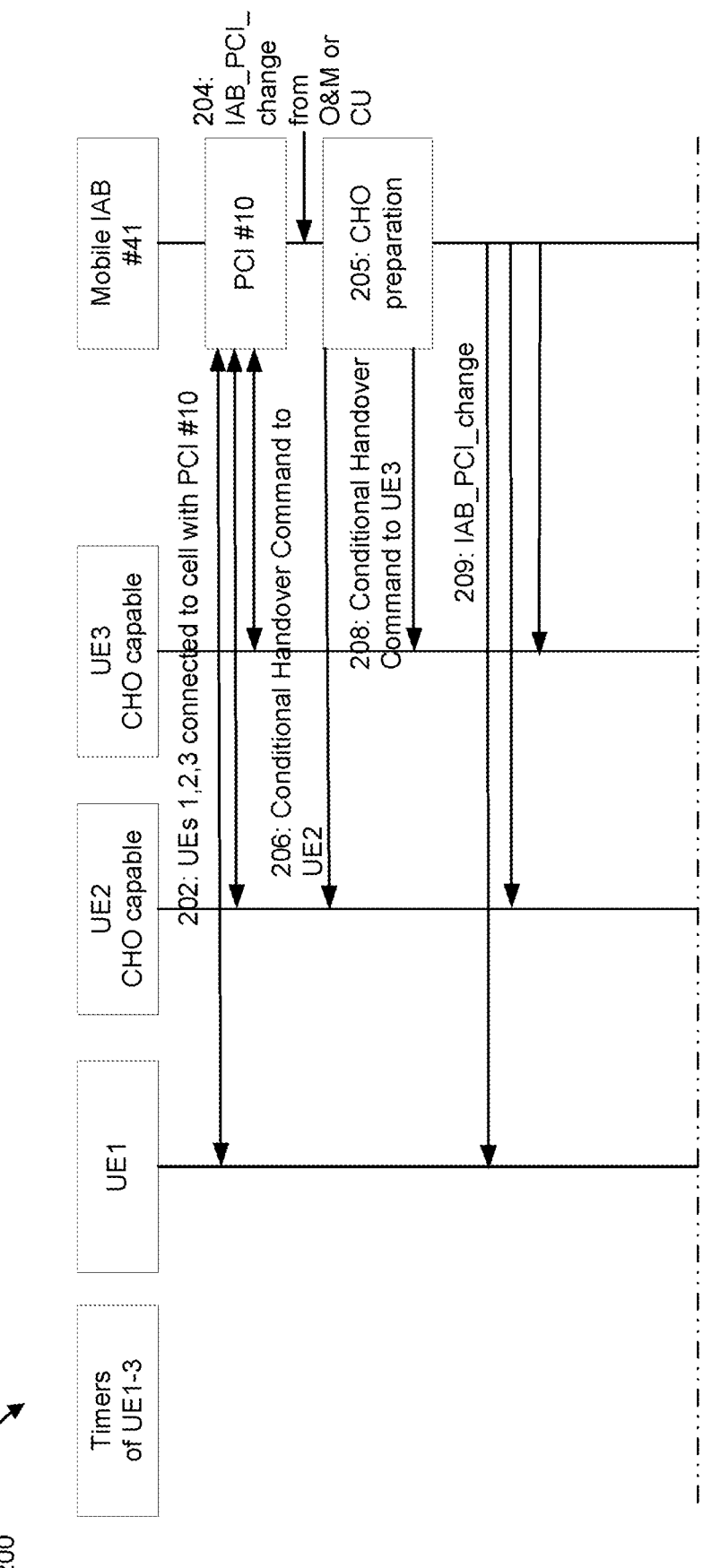
FIG. 2*a* illustrates a portion of an example signal diagram related to accessing a cell based on timers, according to some embodiments.
Figure 2B:
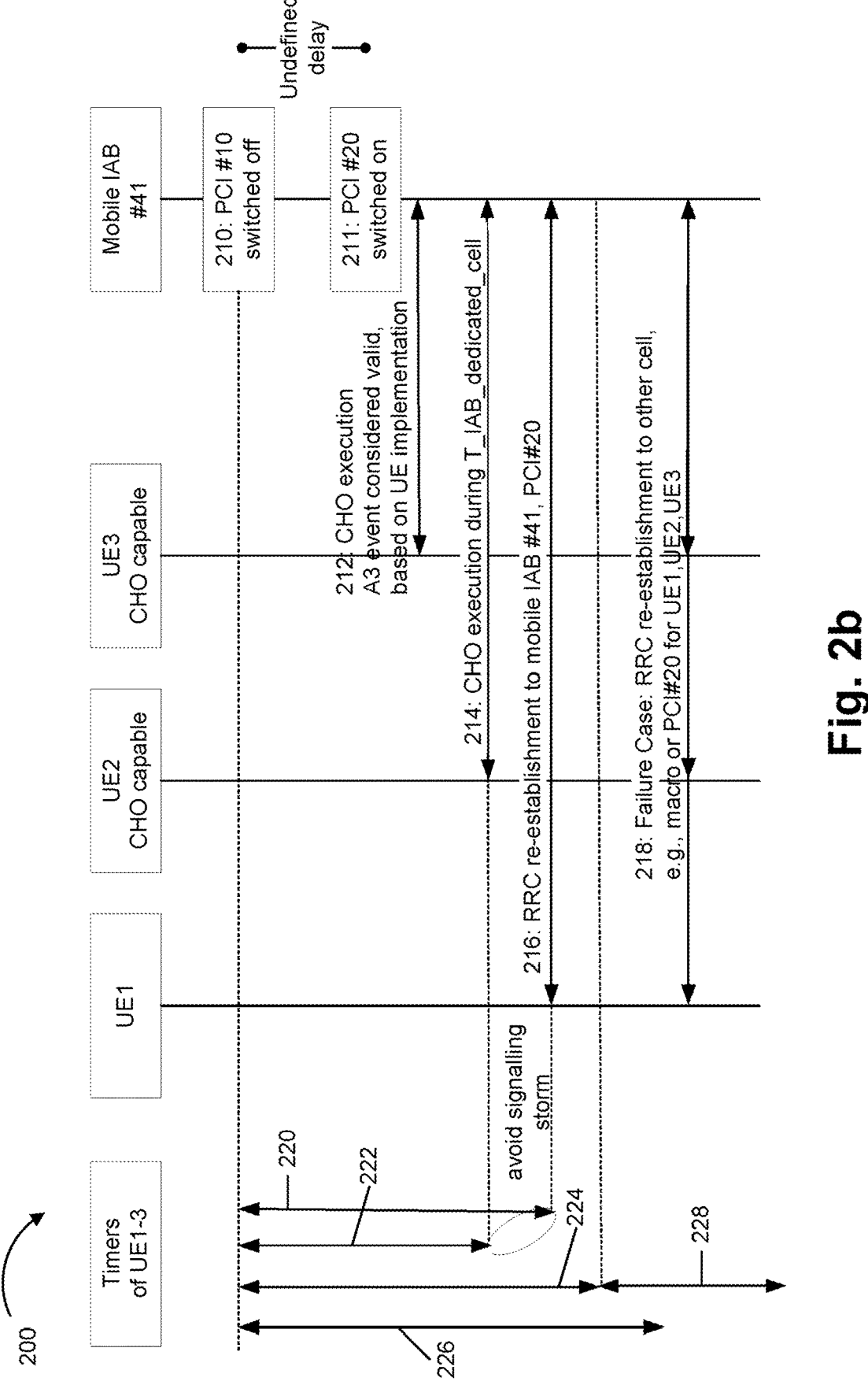
FIG. 2*b* illustrates another portion of the example signal diagram related to accessing a cell based on timers, according to some embodiments.

FIGS. 2a and 2b illustrate an example signal diagram 200 related to access a cell based on timers, according to some embodiments. As illustrated in FIGS. 2a and 2b, the example 200 illustrates timers of UE 1, 2, and 3, a UE 1 (not capable of CHO), a UE2 (CHO capable with legacy A3 trigger behavior), a UE3 (CHO capable and configured to trigger CHO upon loss of sync), and a mobile IAB #41.

As illustrated at 202, the UE1, the UE2, and the UE3 may be connected to the cell (Mobile IAB #41) with PCI value 10 (#10). As illustrated at 204, the mobile IAB #41 may receive the IAB_PCI_change information from O&M or from a CU. IAB #41 performs, at 205, CHO preparation for UE2 and UE3. As illustrated at 206, the mobile IAB #41 may send, and the UE2 may receive, a conditional handover command to the UE2. As illustrated at 208, the mobile IAB

41 may send, and the UE3 may receive, a conditional handover command to the UE3. As illustrated at 209, the mobile IAB #41 may send, and the UE1, UE2 and UE3 may receive, the IAB_PCI_change information.

Turning to FIG. 2b, as illustrated at 210, PCI #10 may be switched off, which may trigger several timers (e.g., T310 (226), T_IAB_delay timer (220 for UE1 and 222 for UE2), T_IAB_dedicated_cell timer (224)) to start. At 211, PCI #20 is switched on. Then UE1, UE2 and UE3 lose sync to PCI #10 and may detect a new cell with PCI #20. Note that the time gap between operations 210 and 211 may vary depending on implementation. At 212, the CHO execution A3 event may be considered valid for UE3, based on UE implementation (note that strictly speaking the RSRP of PCI #10 cannot be evaluated any more, but due to the IAB_PCI_change information it may be set to a (fictive) very low value so that the A3 trigger is fired anyway). The CHO is executed without additional delay. As illustrated at 214, the UE2 capable of CHO but not considering A3 as fulfilled may perform CHO execution to the indicated at least one cell during the time period 224 defined by the T_IAB_dedicated_cell timer when its configured T_IAB_delay timer 222 expires. As illustrated at 216, the UE1 not configured with CHO may perform RRC re-establishment to the mobile IAB #41 using PCI #20 with a delay 220 defined by its T_IAB_delay timer. Note that during the time period 224, UEs 1, 2 and 3 may not be allowed to attempt to access other cells. If any of the UEs fails to establish a link to the cell with PCI #20 within the period 224, this is a failure case of IAB_PCI_change operation and RRC-re-establishment is used. When T_IAB_dedicated_cell timer expires, timer T311 starts (shown as 228), the UE performs RRC re-establishment to another cell, e.g., a macro cell with good RSRP value, during the time period 228 defined by T311. If Timer 311 expires the UE has to change to idle mode.

In some embodiments, in the signal diagram 200, the T310 timer may be longer than T_IAB_dedicated_cell and thus T311 is already running when T310 expires. The timer T310 is then irrelevant.

As indicated above, FIGS. 2a and 2b are provided as an example. Other examples are possible, according to some embodiments.

Figure 3A:
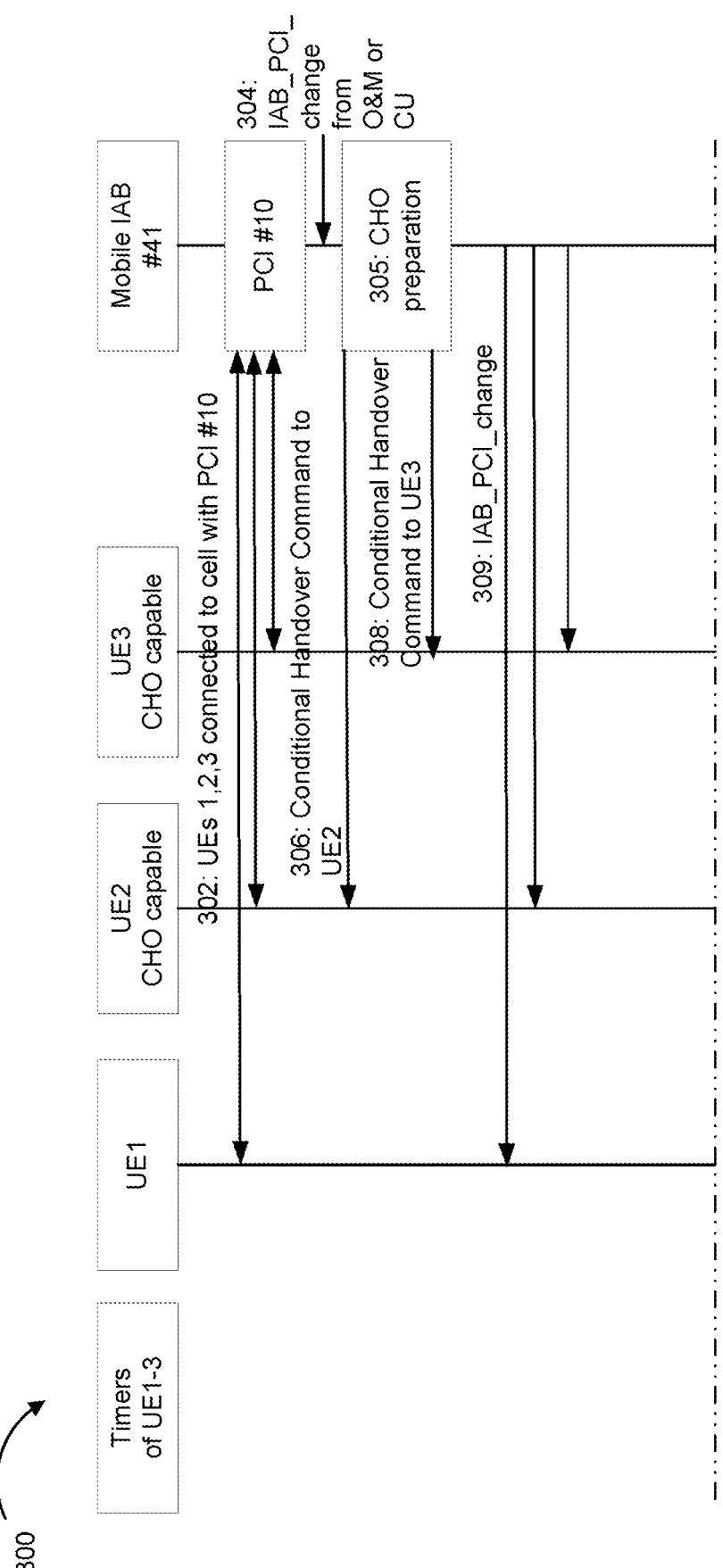
FIG. 3*a* illustrates a portion of another example signal diagram related to accessing a cell based on timers, according to some embodiments.
Figure 3B:
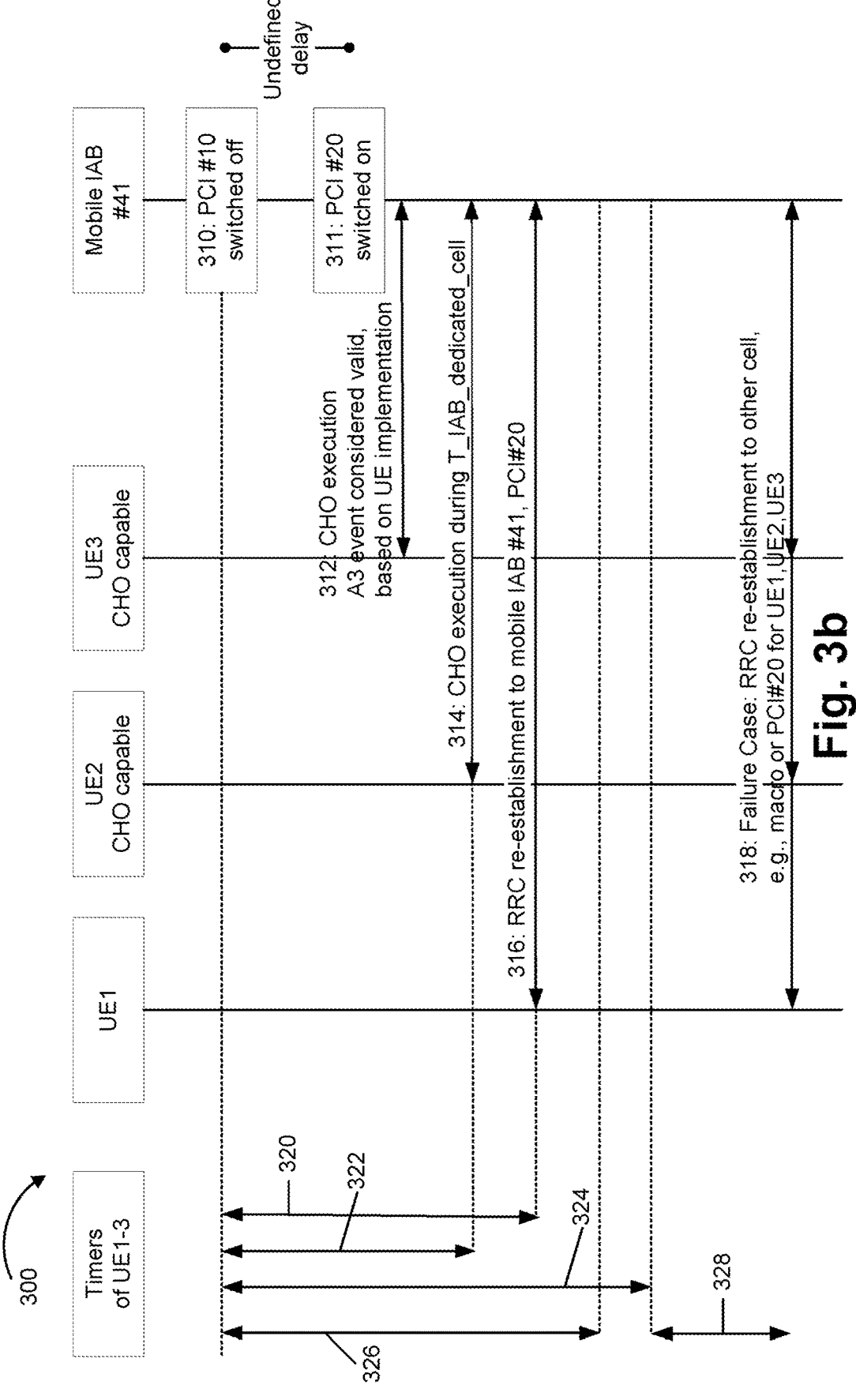
FIG. 3*b* illustrates another portion of the other example signal diagram related to accessing a cell based on timers, according to some embodiments.

FIGS. 3a and 3b illustrate another example signal diagram 300 related to access a cell based on timers, according to some embodiments. The signal diagram 300 includes timers of UEs 1 through 3, a UE1, a UE2 (CHO capable), a UE3 (CHO capable and configured to trigger CHO upon loss of sync), and a mobile IAB #41, similar to the signal diagram 200 of FIGS. 2a and 2b. The operations illustrated at 302, 304, 305 306, 308, and 309 of FIG. 3a may be similar to operations 202, 204, 205, 206, 208, and 209 of FIG. 2a described above. In FIG. 3b, the operations illustrated at 310, 311, 312, 314, 316, and 318 may be similar to operations 210, 211, 212, 214, 216, and 218 of FIG. 2b described above. In the signal diagram 300, the T310 timer (at 326) may start together with the T_IAB_dedicated_cell timer (at 324) and the T_IAB_delay timers (at 320 and 322) in parallel. The UE may attempt to access a cell indicated in configuration information IAB_PCI_change after expiry of T_IAB_delay timer (e.g., 320 or 322) and prior to the expiry of T_IAB_dedicated_cell timer (at 324). A T311 timer (at 328) may be initiated after the T_IAB_dedicated_cell timer (324) expires. In case the configured value of the T310 timer is shorter than the T_IAB_dedicated_cell timer, it is not intended to start a RRC-re-establishment when T310 expires. Thus, the function of T310 is disabled. This operation of the T310 timer may be signaled by setting the T310 timer to zero or to a reserved value. In some embodiments, in the signal diagram 200, the T310 timer may not be started (i.e. disabled), and the T_IAB_dedicated_cell and T_IAB_delay timers may be running in parallel.

As described above, FIGS. 3a and 3b are provided as examples. Other examples are possible, according to some embodiments.

Figure 4A:
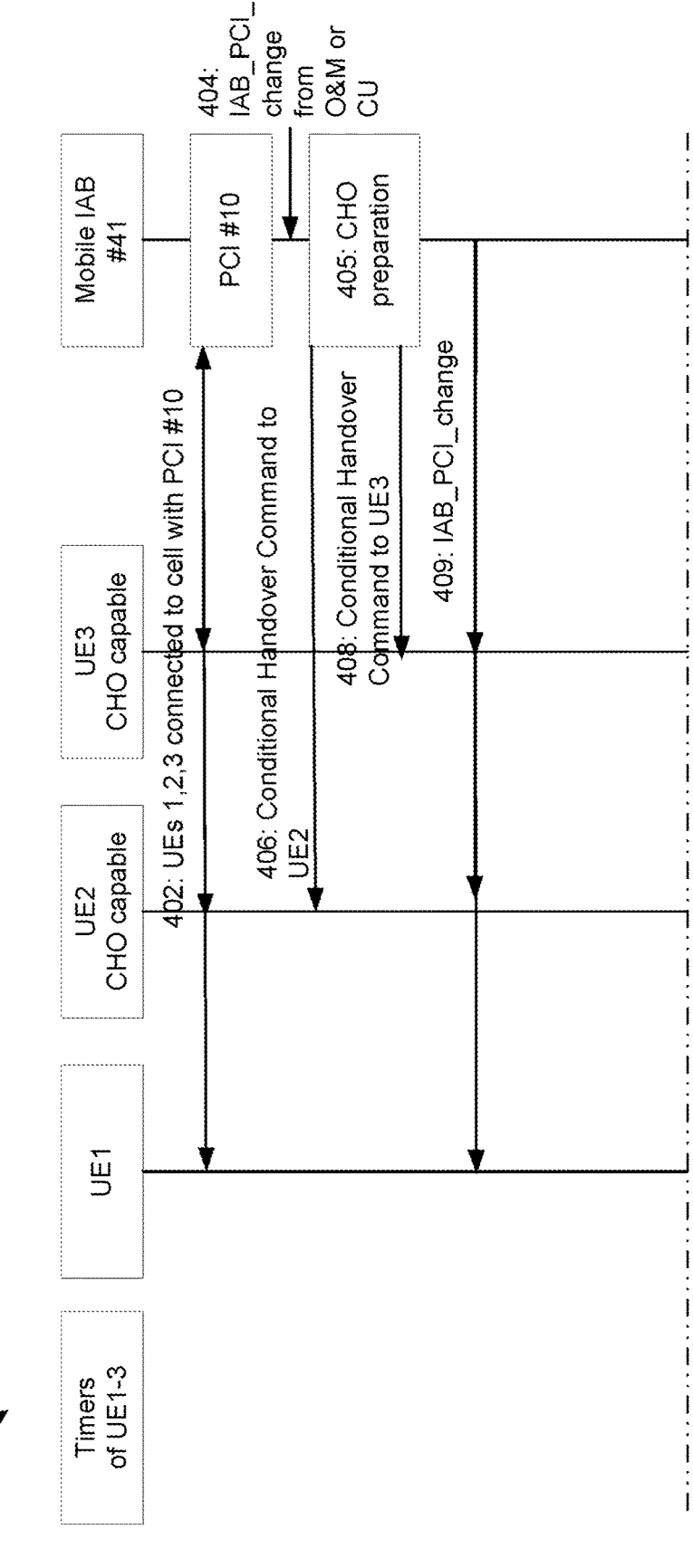
FIG. 4*a* illustrates a portion of another example signal diagram related to accessing a cell based on timers, according to some embodiments.
Figure 4B:
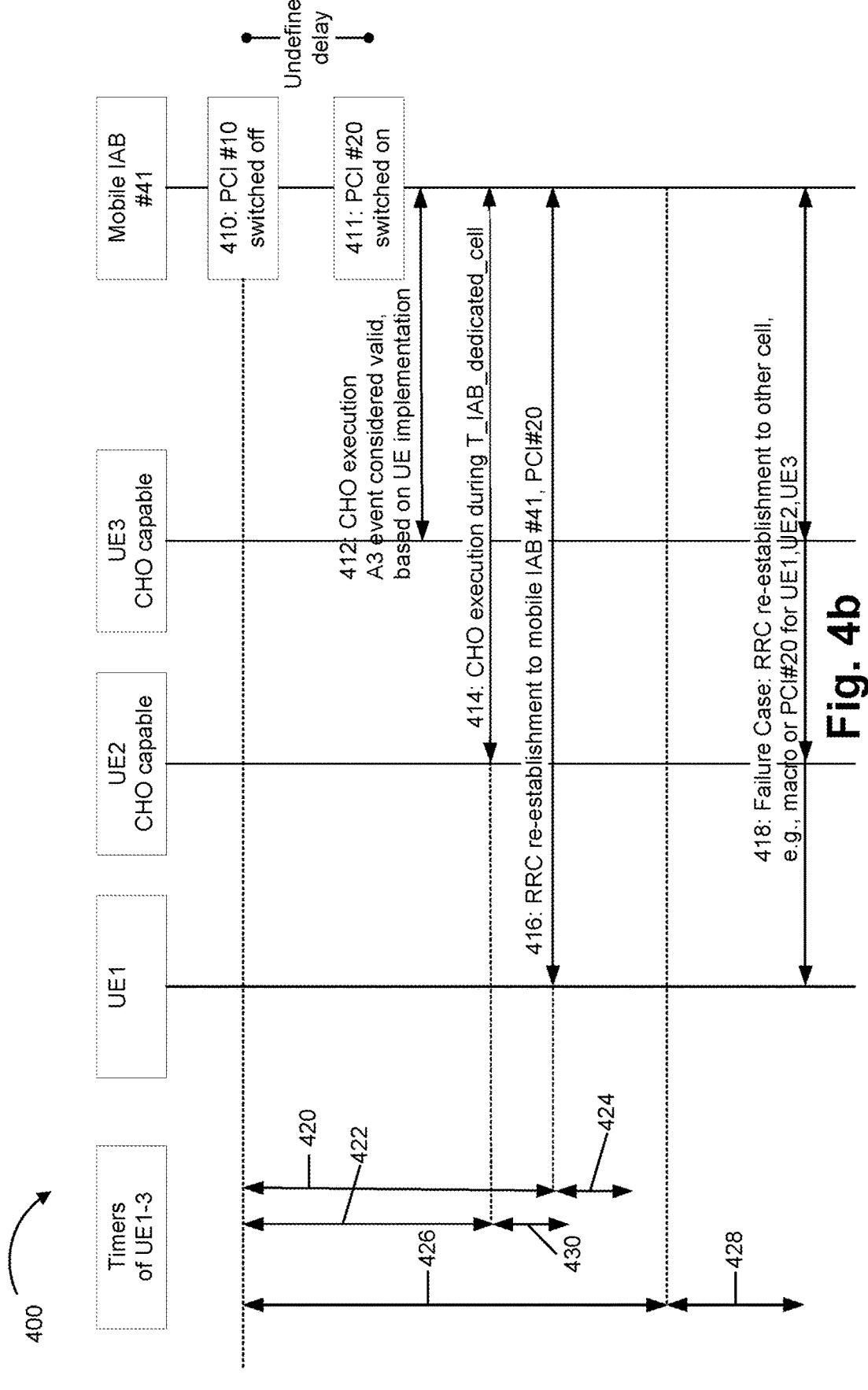
FIG. 4*b* illustrates another portion of the other example signal diagram related to accessing a cell based on timers, according to some embodiments.

FIGS. 4a and 4b illustrate another example signal diagram 400 related to accessing a cell based on timers, according to some embodiments. As illustrated in FIGS. 4a and 4b, the signal diagram 400 illustrates timers of UE 1, 2, and 3, a UE 1, a UE2 (CHO capable), a UE3 (CHO capable and configured to trigger CHO upon loss of sync), and a mobile IAB #41. The operations illustrated at 402, 404, 405, 406, 408, and 409 of FIG. 4a may be similar to operations 202, 204, 205, 206, 208, and 209 of FIG. 2a described above. In FIG. 4b, the operations illustrated at 410, 411, 412, 414, 416, and 418 may be similar to operations 210, 211, 212, 214, 216, and 218 of FIG. 2b described above. The T310 timer (at 426) may start at the same time with the T_IAB_delay timers (at 420 and 422) followed by the T_IAB_dedicated_cell timers (at 424 and 430). As shown in the figure, the T_IAB_delay timers can be UE specific, and thus the T_IAB_dedicated_cell may start at a different time for different UEs. The T310 timer may be configured to a value larger than the T_IAB_dedicated_cell plus the maximum T_IAB_delay timer. A T311 timer (at 428) may be initiated after the T310 timer (426).

As described above, FIGS. 4a and 4b are provided as examples. Other examples are possible, according to some embodiments.

Although FIGS. 2a-4b illustrate certain configurations of timers, some embodiments may involve a UE starting the T310 timer after the dedicated T_IAB_delay timer is expired. This may yield a time spread also for the failure case with the RRC re-establishment procedure.

Figure 5:
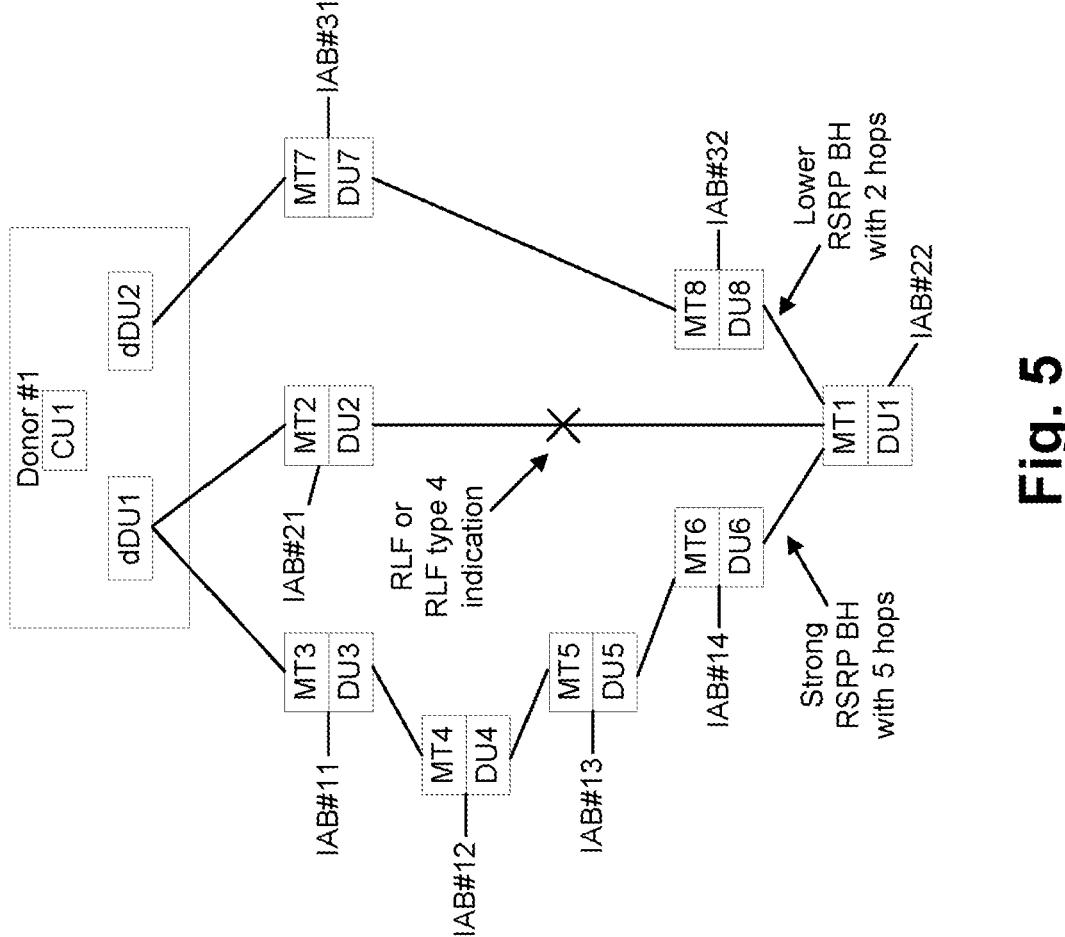
FIG. 5 illustrates an example of a scenario where embodiments of the present disclosure may be applied.
Figure 5:

As mentioned above, certain embodiments can also be applied for an intra- or inter-donor topology adaptation caused by RLF. FIG. 5 illustrates an example 500 of an IAB node topology adaptation caused by a RLF towards a parent IAB node or a RLF type 4 indication from the parent node, according to some embodiments. For example, FIG. 5 illustrates an IAB node #22 whose MT suffers a RLF due to a backhaul failure. Alternatively, also IAB-node #21 may suffer a RLF and may send a RLF Type 4 indication to IAB node #22. In both cases, IAB node #22 may declare RLF, and a topology change may be needed. In NR, the IAB-node may re-establish to any another IAB-node, e.g., based on the RSRP. Such topology changes may lead to an unbalanced length of backhaul adaptation protocol (BAP) chains or an overload of backhaul of the target BAP node. Therefore, the IAB network operator may not wish to base the IAB-node's cell selection on the radio-based cell selection, but may want to control the selection from the CU.

Therefore, the IAB #22 may be configured for RLF cases with a dedicated target cell. This may be achieved with the new RRC message IAB_PCI_change, sent by the CUI to the MT1 of IAB node #22 in FIG. 5, with a proper setting of the new timers. The setting of the timers in FIG. 6 described below may be different from the timer settings as described in FIGS. 2a-4b. In certain embodiments, the T_IAB_delay timer may be set to zero to minimize interruption time. Further, in this scenario the sync failure may be transitory (e.g. a short blocking of the line-of-sight between IAB #22 and its parent IAB #21. So, to allow for an attempt of resyncing to the IAB #21, the T310 timer may not be set to zero.

As described above, FIG. 5 is provided as an example. Other examples are possible, according to some embodiments.

Figure 6:
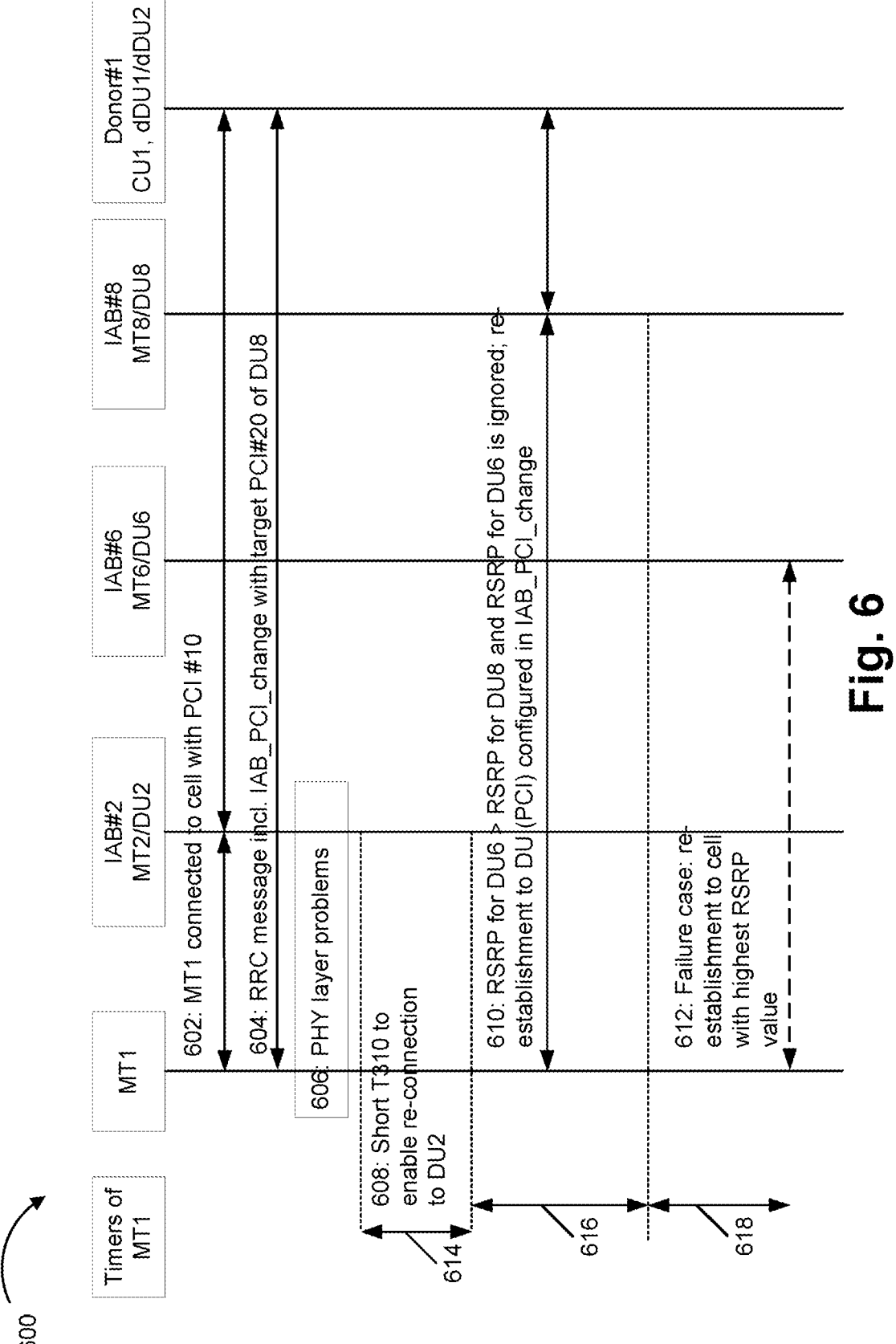
FIG. 6 illustrates another example signal diagram related to accessing a cell based on timers, according to some embodiments.

FIG. 6 illustrates another example signal diagram 600 for timer operation, according to some embodiments. As illustrated in FIG. 6, the example signal diagram 600 includes timers of a MT1, the MT1, an IAB #2 that includes a MT2 and a DU2, an IAB #6 that includes a MT6 and a DU6, an IAB #8 that includes a MT8 and a DU8, and a donor #1 that includes a CUI, a donor DU1 (dDU1), and a donor DU2 (dDU2).

As illustrated at 602, the MT1 may be connected to a cell of dDU2 with PCI #10. As illustrated at 604, the donor #1 and the MT1 may exchange an RRC message that includes the IAB_PCI_change information with the target PCI #20 of DU8. As illustrated at 606, physical (PHY) layer problems may occur with respect to the MT1 and the IAB #2. As illustrated at 608, the MT1 may initiate the short T310 timer (614) to enable re-connection to the DU2. In this example, timer T_IAB_Dedicated_Cell (616) starts after expiry of T310. If re-connection to the DU2 fails, the MT1 may attempt to access a new parent cell. As illustrated at 610, the RSRP for DU6 may be greater than the RSRP for DU8, but DU6 may be ignored, and a re-establishment is executed to a DU with the PCI configured in the IAB_PCI_change information of 604. For example, the RSRP for DU6 is greater than the RSRP for DU8, the RSRP for DU6 is ignored, and the BH link is reestablished to the configured cell of IAB #8 with PCI #20. As illustrated at 612, there may be a failure case when the re-establishment to the configured PCI is not successful within T_IAB_Dedicated_Cell (616), and the MT1 may perform re-establishment to the cell with the highest RSRP value, e.g. at the IAB #6. A T310 timer (at 614), a T_IAB_Dedicated_Cell (at 616), and a T311 (at 618) may be used in connection with certain embodiments illustrated in FIG. 6.

In this way, certain embodiments may achieve a controlled re-establishment of the IAB node to the configured target parent, without the need for a CHO preparation which may block resources in the target cell. This may apply to CHO optimization in an IAB.

As described above, FIG. 6 is provided as an example. Other examples are possible, according to some embodiments.

Figure 7:
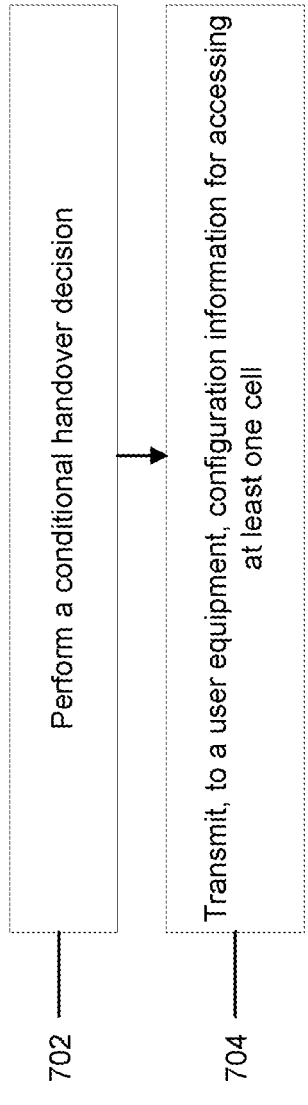
FIG. 7 illustrates an example flow diagram of a method, according to some embodiments.

FIG. 7 illustrates an example flow diagram of a method 700, according to some embodiments. For example, FIG. 7 may illustrate example operations of a network node (e.g., apparatus 10 illustrated in, and described with respect to, FIG. 9a). Specifically, FIG. 7 may illustrate example embodiments of a source donor CU similar to that in FIGS. 1a-1c. Some of the operations illustrated in FIG. 7 may be similar to some operations shown in, and described with respect to, FIGS. 1a-6.

In an embodiment, the method 700 may include, at 702, performing a conditional handover decision, e.g., in a manner similar to that at 104 of FIG. 1a. The method 700 may include, at 704, transmitting, to a user equipment, configuration information for accessing at least one cell, e.g., in a manner similar to that at 112 of FIG. 1a. The configuration information may include one or more identities of the at least one cell, and wherein the at least one cell is associated with a dedicated time period defined by a timer, and the dedicated time period is for accessing exclusively the at least one cell when a failure is detected for a link to a current serving cell of the user equipment. "Dedicated" and "exclusively" may mean that access of cells different from the one or more identities of the at least one cell is not allowed during the time period. In some embodiments, the configuration information may further comprise a configuration of the timer for defining the dedicated time period. Alternatively, the configuration of the timer may be predefined or preconfigured, or sent to the user equipment in a message separate from the configuration information.

The method 700 illustrated in FIG. 7 may include one or more additional aspects described below or elsewhere herein. In some embodiments, the method 700 may further include receiving the configuration information from a target donor centralized unit, e.g., in a manner similar to that at 110 of FIG. 1a, or an operation and management-related node. In some embodiments, the transmitting at 704 may include transmitting the configuration information via an integrated access and backhaul distributed unit or a mobile integrated access and backhaul node. In an embodiment, the method 700 may include transmitting a radio resource control reconfiguration message, e.g., in a manner similar to that at 118 of FIG. 1b. For example, the radio resource control reconfiguration may be transmitted to an IAB node serving the UE. The radio resource control reconfiguration message may include at least one of the one or more identities. In some embodiments, the method 700 may include transmitting an F1 application protocol radio resource control reconfiguration message comprising at least one of the one or more identities, to an integrated access and backhaul node serving the user equipment, e.g., in a manner similar to that at 122 of FIG. 1b. For example, this may configure a distributed unit and the cell parameters of the cell serving the UE. In some embodiments, the apparatus may include a source donor centralized unit.

Thus, certain embodiments may avoid a signaling storm of UEs inside, e.g., a moving IAB node, avoid UEs inside a mobile IAB node selecting another cell instead of re-connecting to the reconfigured moving IAB node, achieve energy saving in UEs (avoiding unnecessary re-sync during the T310 timer), and/or faster RRC re-establishment to an IAB node which had to change the PCI. Note that the configuration information may be transmitted in at least one of: a broadcast message, a groupcast message, a conditional handover message, or a radio resource control reconfiguration message.

As described above, FIG. 7 is provided as an example. Other examples are possible according to some embodiments.

Figure 8:
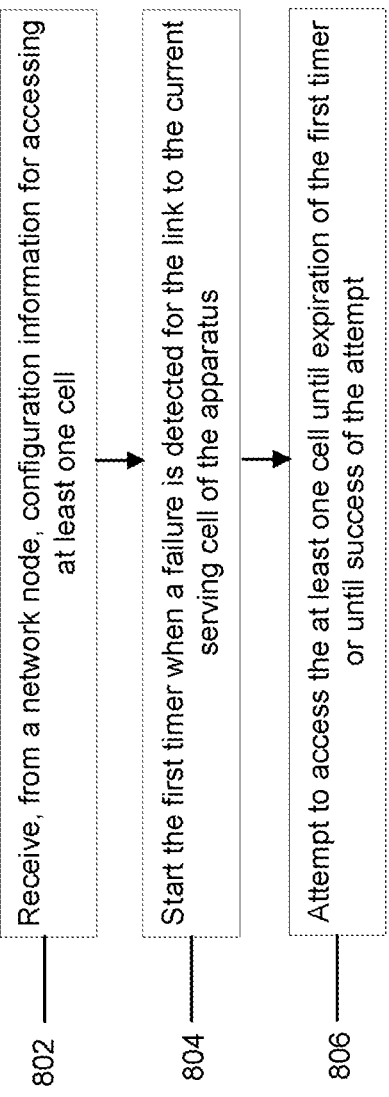
FIG. 8 illustrates an example flow diagram of a method, according to some embodiments.

FIG. 8 illustrates an example flow diagram of a method 800, according to some embodiments. For example, FIG. 8 may illustrate example operations of a UE or IAB-MT (e.g., apparatus 20 illustrated in, and described with respect to, FIG. 9b). Specifically, FIG. 8 may illustrate some example operations of the UE of FIGS. 1a-1c. Some of the operations illustrated in FIG. 8 may be similar to some operations shown in, and described with respect to, FIGS. 1a-6.

In an embodiment, the method 800 may include, at 802, receiving, from a network node, configuration information for accessing at least one cell, e.g., in a manner similar to that at 114 and/or 116 of FIG. 1b. The configuration information may include one or more identities of the at least one cell, and wherein the at least one cell is associated with a dedicated time period defined by a first timer, and the dedicated time period is for accessing exclusively the at least one cell when a failure is detected for a link to a current serving cell of the user equipment. The method 800 may include, at 804, starting the first timer when a failure is detected for the link to the current serving cell of the apparatus (UE/MT). The method 800 may include, at 806, attempting to access the at least one cell until expiration of the first timer or until success of the attempt. In some embodiments, the configuration information may further include a configuration of the first timer. Alternatively, the configuration of the first timer may be predefined or pre-configured, or sent to the user equipment in a message separate from the configuration information.

The method illustrated in FIG. 8 may include one or more additional aspects described below or elsewhere herein. In some embodiments, the apparatus (e.g., UE) may be configured with conditional handover, and the attempting at 806 may include, when a cell of the at least one cell is detectable and the apparatus (e.g., UE) has a conditional handover configuration for the detected cell, performing the conditional handover to the cell (e.g., in a manner similar to that at 134 of FIG. 1*c*), or when the cell of the at least one cell is detectable and the apparatus (e.g., UE) does not have the conditional handover configuration for the detected cell, performing a re-establishment to the cell. In some embodiments, the UE may not be configured with conditional handover, and the attempting at 806 may include, when a cell of the at least one cell is detectable, performing a connection re-establishment to the detectable cell (e.g., in a manner similar to that at 136 of FIG. 1*c*).

In some embodiments, the configuration information may be received in at least one of: a broadcast message, a groupcast message, a conditional handover message, or a radio resource control reconfiguration message. In some embodiments, the receiving at 802 may include receiving the configuration information from an integrated access and backhaul node. In some embodiments, the receiving at 802 may include receiving the configuration information from an integrated access and backhaul node. In some embodiments, the receiving at 802 may include receiving the configuration information from a source donor centralized unit. In some embodiments, the receiving at 802 may include receiving the configuration information from a target donor central-ized unit via the source donor centralized unit.

In some embodiments, the method 800 may further include receiving a configuration of a second timer (e.g., T310 timer) related to radio link failure detection, and disabling the second timer when receiving the configuration information. In some embodiments, the method 800 may further include, upon expiry of the first timer, start a third timer (e.g., a T311 timer), and attempt to access a cell different from the at least one cell prior to expiry of the third timer, as shown in the example of FIG. 2*b* and FIG. 3*b*. In some embodiments, the method 800 may further include starting a fourth timer (e.g., a UE specific delay timer) simultaneously with the first timer, and the attempting at 806 may include attempting to access the at least one cell after expiry of the fourth timer and prior to expiry of the first timer, as shown in the example of FIG. 2*b* and FIG. 3*b*. In some embodiments, the method 800 may further include starting a fourth timer when a failure is detected for a link to the current serving cell, and the starting at 804 may include starting the first timer after expiry of the fourth timer. In some embodiments, the fourth timer may be a UE-specific delay timer, e.g., T_IAB_delay 420 or 422 described with reference to FIG. 4*b*. In some embodiments, the fourth timer may be a timer defining a time period for re-connecting the current serving cell. For example, the fourth timer may be T310 in the example shown in FIG. 6.

Thus, certain embodiments may avoid a signaling storm of UEs inside, e.g., a moving IAB node, avoid UEs inside a mobile IAB node selecting another cell instead of re-connecting to the reconfigured moving IAB node, achieve energy saving in UEs (avoiding unnecessary re-sync during the T310 timer), and/or faster RRC re-establishment to an IAB node which had to change the PCI.

As described above, FIG. 8 is provided as an example. Other examples are possible according to some embodiments.

Figures 9A, 9B:
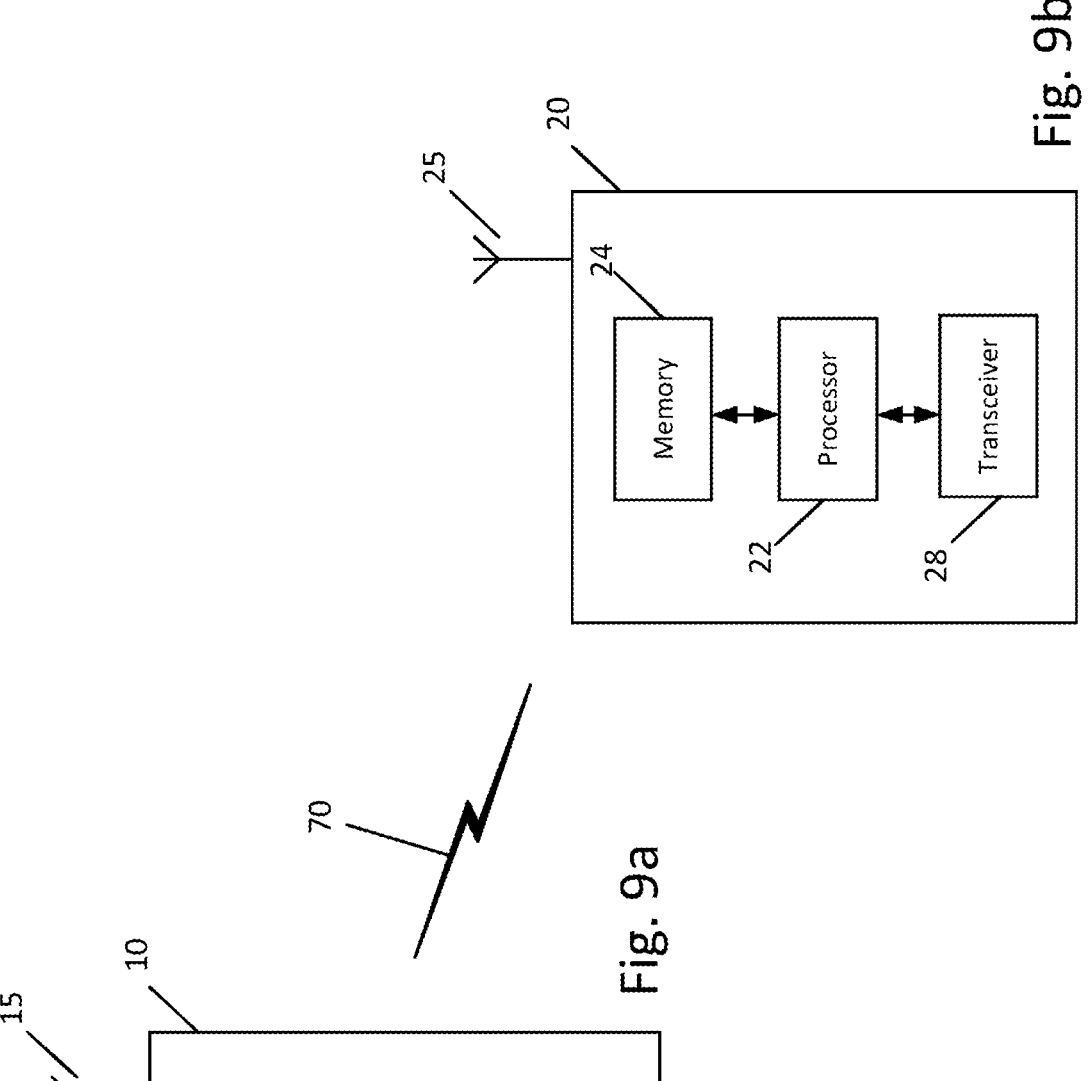
FIG. 9*a* illustrates an example block diagram of an apparatus, according to an embodiment.
FIG. 9*b* illustrates an example block diagram of an apparatus, according to another embodiment.

FIG. 9*a* illustrates an example of an apparatus 10 accord-ing to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, a 5G IAB donor node, a next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodi-ments, apparatus 10 may be comprised of an edge cloud server as a distributed computing system where the server and the radio node may be stand-alone apparatuses commu-nicating with each other via a radio path or via a wired connection, or they may be located in a same entity com-municating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 9*a*.

As illustrated in the example of FIG. 9*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9*a*, multiple processors may be utilized according to other embodiments. For example, it should be understood that, in certain embodiments, apparatus 10 may include two or more processors that may form a multipro-cessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication mes-sage, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may also include or be coupled to one or more fiber or cable interfaces for connection with other CUs and/or a core network. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of Global System for Mobile Communications (GSM), narrow-band IoT (NB-IOT), LTE, 5G, Wireless Local Area Network (WLAN), Bluetooth (BT), Bluetooth Low Energy (BT-LE), Near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-8. For instance, apparatus 10 may be controlled by memory 14 and processor 12 to perform the method of FIG. 7.

FIG. 9*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IAB node device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IOT device, MT function of an IAB node, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IOT, Bluetooth, NFC, MulteFire, and/or any other radio access technologies. It should be noted that one of ordinary skill in the art would understand that apparatus 20 may include components or features not shown in FIG. 9*b*.

As illustrated in the example of FIG. 9*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IOT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as Orthogonal Frequency-Division Multiple Access (OFDMA) symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IOT device, for example. According to certain embodiments, apparatus 20 may be controlled by memory 24 and processor 22 to perform the functions associated with any of the embodiments described herein, such as some operations illustrated in, or described with respect to, FIGS. 1-8. For instance, in one embodiment, apparatus 20 may be controlled by memory 24 and processor 22 to perform the method of FIG. 8.

In some embodiments, an apparatus (e.g., apparatus 10 and/or apparatus 20) may include means for performing a method or any of the variants discussed herein, e.g., a method described with reference to FIG. 7 or 8. Examples of the means may include one or more processors, memory, and/or computer program code for causing the performance of the operation.

Therefore, certain example embodiments provide several technological improvements, enhancements, and/or advantages over existing technological processes. For example, some benefits of some example embodiments are avoiding a signaling storm of UEs inside the moving IAB node, avoiding of UEs inside a mobile IAB node selecting another cell instead of re-connecting to the reconfigured moving IAB node, achieving energy saving in UEs (avoiding unnecessary re-sync during the T310 timer), and/or faster RRC re-establishment to an IAB node which had to change the PCI. Additionally, or alternatively, other benefits of some example embodiments are a solution for an unbalanced length of BAP chains in case of IAB node topology adaptation and/or solution for an overload of backhaul of the target BAP node in case of IAB node topology adaptation. Accordingly, the use of some example embodiments results in improved functioning of communications networks and their nodes and, therefore constitute an improvement at least to the technological field of UE or MT handover with respect to PCI change, among others.

Certain embodiments described herein may be applicable to other uses cases and base stations which have to change the PCI, e.g., non-terrestrial networks (NTN), high altitude platforms (HAPs), unmanned aircraft systems (UAS), mobile base stations on the ground (terrestrial), for emergencies, military applications, etc., and/or installations of small cells which may also lead to more regular PCI changes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural wording is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

BAP Backhaul Adaptation Protocol
CU Central Unit
DU Distributed Unit
IAB Integrated Access and Backhaul
HAPs High Altitude Platforms
MT Mobile Terminal, i.e. UE part of an IAB-node
NCI NR Cell Identity
NCGI NR Cell Global Identity
NR New Radio
NTN Non-Terrestrial Networks
O&M Operation and Management
PCI Physical Layer Cell ID
PSS Primary Synchronization Signal
RACH Random Access Channel.
RLF Radio Link Failure
RSRP Reference Signal Received Power
SSB Synchronization Signal Block
SSS Secondary Synchronization Signal
UE User Equipment
UAS Unmanned Aircraft Systems

The invention claimed is:

1. An apparatus, comprising:
at least one processor; and
at least one memory including computer program code, wherein the at least one memory and the computer program code are configured to, with the at least one processor, cause the apparatus at least to:
receive, from a network node, configuration information for accessing at least one cell, the configuration information comprising one or more identities of the at least one cell, wherein the at least one cell is associated with a dedicated time period defined by a first timer, and the dedicated time period is for accessing exclusively the at least one cell when a failure is detected for a link to a current serving cell of the apparatus;
start the first timer when a failure is detected for the link to the current serving cell of the apparatus; and
attempt to access the at least one cell until expiration of the first timer or until success of the attempt,
wherein the at least one memory and the computer program code are configured to, with the at least one processor, further cause the apparatus at least to:
upon expiry of the first timer, start a second timer; and
attempt to access a cell different from the at least one cell prior to expiry of the second timer.
2. The apparatus according to claim 1, wherein the apparatus is configured with conditional handover, and wherein the at least one memory and the computer program code are configured to, with the at least one processor, further cause the apparatus, when attempting to access the at least one cell, at least to:

when a cell of the at least one cell is detectable and the apparatus has a conditional handover configuration for the detected cell, perform the conditional handover to the cell, or when the cell of the at least one cell is detectable and the apparatus does not have the conditional handover configuration for the detected cell, perform a re-establishment to the cell.

3. The apparatus according to claim 1, wherein the apparatus is not configured with conditional handover, and wherein the at least one memory and the computer program code are configured to, with the at least one processor, further cause the apparatus, when attempting to access the at least one cell, at least to:

when a cell of the at least one cell is detectable, perform a connection re-establishment to the detectable cell.

4. The apparatus according to claim 1, wherein the configuration information is received in at least one of:

a broadcast message, a groupcast message, a conditional handover message, or a radio resource control reconfiguration message.

5. The apparatus according to claim 1, wherein receiving the configuration information comprises:

receiving the configuration information from an integrated access and backhaul node, or receiving the configuration information from a source donor centralized unit, or receiving the configuration information from a target donor centralized unit via the source donor centralized unit.

6. The apparatus according to claim 1, wherein the at least one memory and the computer program code are configured to, with the at least one processor, further cause the apparatus at least to:

receive a configuration of a third timer related to radio link failure detection; and disable the third timer when receiving the configuration information.

7. The apparatus according to claim 1, wherein the configuration information further comprises a configuration of the first timer.

8. An apparatus, comprising:

at least one processor; and at least one memory including computer program code, wherein the at least one memory and the computer program code are configured to, with the at least one processor, cause the apparatus at least to:

receive, from a network node, configuration information for accessing at least one cell, the configuration information comprising one or more identities of the at least one cell, wherein the at least one cell is associated with a dedicated time period defined by a first timer, and the dedicated time period is for accessing exclusively the at least one cell when a failure is detected for a link to a current serving cell of the apparatus;

start the first timer when a failure is detected for the link to the current serving cell of the apparatus; and attempt to access the at least one cell until expiration of the first timer or until success of the attempt, wherein the at least one memory and the computer program code are configured to, with the at least one processor, further cause the apparatus at least to:

start a fourth timer simultaneously with the first timer; and wherein the attempting to access the at least one cell comprises:

attempting to access the at least one cell after expiry of the fourth timer.

9. The apparatus according to claim 8, wherein the apparatus is configured with conditional handover, and wherein the at least one memory and the computer program code are configured to, with the at least one processor, further cause the apparatus, when attempting to access the at least one cell, at least to:

when a cell of the at least one cell is detectable and the apparatus has a conditional handover configuration for the detected cell, perform the conditional handover to the cell, or when the cell of the at least one cell is detectable and the apparatus does not have the conditional handover configuration for the detected cell, perform a re-establishment to the cell.

10. The apparatus according to claim 8, wherein the apparatus is not configured with conditional handover, and wherein the at least one memory and the computer program code are configured to, with the at least one processor, further cause the apparatus, when attempting to access the at least one cell, at least to:

when a cell of the at least one cell is detectable, perform a connection re-establishment to the detectable cell.

11. The apparatus according to claim 8, wherein the configuration information is received in at least one of:

a broadcast message, a groupcast message, a conditional handover message, or a radio resource control reconfiguration message.

12. The apparatus according to claim 8, wherein receiving the configuration information comprises:

receiving the configuration information from an integrated access and backhaul node, or receiving the configuration information from a source donor centralized unit, or receiving the configuration information from a target donor centralized unit via the source donor centralized unit.

13. The apparatus according to claim 8, wherein the at least one memory and the computer program code are configured to, with the at least one processor, further cause the apparatus at least to:

receive a configuration of a third timer related to radio link failure detection; and disable the third timer when receiving the configuration information.

14. An apparatus, comprising:

at least one processor; and at least one memory including computer program code, wherein the at least one memory and the computer program code are configured to, with the at least one processor, cause the apparatus at least to:

receive, from a network node, configuration information for accessing at least one cell, the configuration information comprising one or more identities of the at least one cell, wherein the at least one cell is associated with a dedicated time period defined by a first timer, and the dedicated time period is for accessing exclusively the at least one cell when a failure is detected for a link to a current serving cell of the apparatus;

start the first timer when a failure is detected for the link to the current serving cell of the apparatus; and attempt to access the at least one cell until expiration of the first timer or until success of the attempt, wherein the at least one memory and the computer program code are configured to, with the at least one processor, further cause the apparatus at least to:

start a fourth timer when a failure is detected for a link to the current serving cell; and wherein starting the first timer comprises:

starting the first timer after expiry of the fourth timer.

15. The apparatus according to claim 14, wherein the fourth timer comprises one of:

a timer defining a user-specific time delay, or a timer defining a time period for re-connecting to the current serving cell.

16. The apparatus according to claim 14, wherein the apparatus is configured with conditional handover, and wherein the at least one memory and the computer program code are configured to, with the at least one processor, further cause the apparatus, when attempting to access the at least one cell, at least to:

when a cell of the at least one cell is detectable and the apparatus has a conditional handover configuration for the detected cell, perform the conditional handover to the cell, or when the cell of the at least one cell is detectable and the apparatus does not have the conditional handover configuration for the detected cell, perform a re-establishment to the cell.

17. The apparatus according to claim 14, wherein the apparatus is not configured with conditional handover, and wherein the at least one memory and the computer program code are configured to, with the at least one processor, further cause the apparatus, when attempting to access the at least one cell, at least to:

when a cell of the at least one cell is detectable, perform a connection re-establishment to the detectable cell.

18. The apparatus according to claim 14, wherein the configuration information is received in at least one of:

a broadcast message, a groupcast message, a conditional handover message, or a radio resource control reconfiguration message.

19. The apparatus according to claim 14, wherein receiving the configuration information comprises:

receiving the configuration information from an integrated access and backhaul node, or receiving the configuration information from a source donor centralized unit, or receiving the configuration information from a target donor centralized unit via the source donor centralized unit.

20. The apparatus according to claim 14, wherein the at least one memory and the computer program code are configured to, with the at least one processor, further cause the apparatus at least to:

receive a configuration of a third timer related to radio link failure detection; and disable the third timer when receiving the configuration information.

* * * * *